(12) United States Patent
Burton, Jr.

(10) Patent No.: US 8,503,986 B2
(45) Date of Patent: Aug. 6, 2013

(54) AUDIO CONTENT DISTRIBUTION CONTROL SYSTEM

(76) Inventor: Clayton B. Burton, Jr., Clearwater, FL (US)

(*) Notice: Subject to any disclaimer, the term of this patent is extended or adjusted under 35 U.S.C. 154(b) by 0 days.

(21) Appl. No.: 13/100,233

(22) Filed: May 3, 2011

(65) Prior Publication Data
US 2012/0030236 A1 Feb. 2, 2012

Related U.S. Application Data

(63) Continuation-in-part of application No. 10/795,125, filed on Mar. 5, 2004, now Pat. No. 7,937,098.

(51) Int. Cl.
*H04W 88/02* (2009.01)

(52) U.S. Cl.
USPC ........................................... 455/412.1

(58) Field of Classification Search
USPC ............ 455/412.1, 3.02, 45, 503; 379/88.22, 379/101.01, 162, 202.01
See application file for complete search history.

(56) References Cited

U.S. PATENT DOCUMENTS
2004/0174858 A1* 9/2004 Caspi et al. .................. 370/351

* cited by examiner

*Primary Examiner* — Diane Mizrahi
(74) *Attorney, Agent, or Firm* — Johnson & Martin, P.A.; James David Johnson

(57) ABSTRACT

A system for providing access to audio files at multiple locations via a telecommunications network is described. The system includes an interface by which an end user can access at least one audio file from an online database; a system for selecting at least one audio file from the online database for inclusion in a playlist; a plurality of playback devices located in multiple locations; and a system for transmitting the at least one audio file for playing on the plurality of playback devices in multiple locations.

23 Claims, 44 Drawing Sheets

Customer View - Account Management Mode - Credit Tab (if no credit account established)

USER ID: johndoe@yahoo.com   Log Out

Need help? Call (800)741-AMTC(2682)

AMTC

| Account Management | Device Management | Payment Profiles |

| Details | Payment Info | Quotes/Orders | Credit | Messaging Jobs |

Complete the information below to apply for an AMTC Credit Account. Dun and Bradstreet charges $50.00 for the credit information required to review your application. Once you click "Submit", a payment of $50.00 will be required. Should your application be approved, you will be provided with a coupon code good for a $50.00 credit on your first order of $1000.00 or more.

Company [Display Billing User - Read Only]
DUNS Number [        ]
Credit Limit Requested [        ]

[Submit]

- clicking "Submit" initiates UI for user to pay the credit app fee - once paid, user info is forwarded to D and B to obtain a credit report

Customer View - Device Management Mode - Installation Jobs Tab

USER ID: johndoe@yahoo.com    Log Out

Need help? Call (800)741-AMTC(2682)

AMTC

| Account Management | Device Management | | | | |
|---|---|---|---|---|---|
| Details | Zone 1 | Zone 2 | Technical | Additional Users | Installation Jobs |

Pending Jobs

| Job ID | Initiated | Last Status Change | Status |
|---|---|---|---|
| 2109 | Feb 8 2011 11:15p | Feb 20 2011 11:15p | Complete |
| 3964 | Feb 12 2011 02:29p | Feb 20 2011 02:29p | Awaiting customer approval of job |
| 4012 | Feb 14 2011 04:29p | Feb 19 2011 04:29p | Scheduled |
| 4653 | Feb 19 2011 10:02a | Feb 19 2011 10:02a | Assigned to installer |

FIG. 43

AUDIO CONTENT DISTRIBUTION CONTROL SYSTEM

CROSS-REFERENCE TO RELATED APPLICATION

This application is a continuation-in-part of and claims priority from U.S. nonprovisional patent application Ser. No. 10/795,125 filed on Mar. 5, 2004 which is incorporated in its entirety herein by reference.

FIELD OF THE INVENTION

The present invention is directed to systems and methods for distributing audio content to remote locations. In particular, the present invention is directed to systems and methods for permitting end users to remotely select audio content to be distributed to a remote location and to control the features related to that audio content distribution.

BACKGROUND

One of the fastest growing areas of business is the use of on-hold messaging systems to provide general business and marketing information and the like. The simplest on hold system plays background music while the end user is on hold. More recently, companies have begun to combine music with voiceovers. The inclusion of voiceovers permits businesses to incorporate news about the business and new products or services. Today, on hold systems provide valuable information to potential and existing customers.

A system exists for providing a single on-hold audio message to a plurality of business telephone systems at separated geographic locations converts the audio message into digital form, compresses the resulting digital file, and transmits the file via the Internet as an attachment to an e-mail message to general purpose computers located in association with each of the business telephone systems. Each of the general purpose computers receiving the message writes it onto a floppy disc which is provided to an associated playback unit. The playback units read the compressed digital files representing the on-hold message, provide the re-circulating flash memories, provide the output of the flash memories to de-compressors and the output of the de-compressors to digital-to-analog converters. The resulting audio signals are applied to the on-hold inputs of each of the business telephone systems.

An on-hold messaging system has also been created for use with a business telephone system having an on-hold audio input. The system includes an optical disc having one or more messages recorded thereon, an optical disc player having an audio output, and a connection or interface between the audio output of the optical disc player and the on-hold input of the business telephone system. The optical disc player is enabled to continuously play the message or messages through the business telephone system, so that at least a portion of a message can be heard by an outside party when a telephone call between the outside party and a user of the business telephone system has been completed and the outside party is placed on hold by a user of the business telephone system. Optionally, an audio amplifier may be used as an interface between the optical disc player and the on-hold input of the business telephone system, so that the sound quality of the message as heard by the outside party is satisfactory.

A point to multipoint messaging system has been developed utilizing the FM 57 kHz Radio Broadcast Data System (RBDS) standard and a novel receiver. A single broadcast source sends messages from multiple senders, in a variety of manners including automatically and semi-automatically, to a plurality of receivers who may select to receive or not to receive particular senders' messages. The receiver is remotely programmable by the user so that the user may select to receive at least some messages Some systems have been created to address problems related to audio conference calls. The music on-hold-problem occurs when a conferee having music-on-hold puts the conference call on hold, resulting in a continuous stream of music being transmitted to the other conferees. Such a conferee is called an offending conferee. The solution presented herein is to prevent music-on-hold signals emanating from an offending conferee from being passed through an audio conference bridge to the other conferees. This is accomplished, in particular embodiments, by directing a merging/summing subsystem of the audio conference bridge to temporarily stop combining audio emanating from the offending conferee from being combined or merged onto audio channels through which the other conferees communicate on the audio conference. Once the music-on-hold is terminated, the offending conferee can rejoin conference call by sending a signal that directs the merging/summing subsystem to resume the combining of audio signals emanating from the offending conferee onto the audio channels of the other conferees.

Another conventional remotely programmable message delivery system features a number of client computers which communicate with a server to send control signals to one or more remote message playback devices. The message playback devices are each provided with a library of messages, and comprise at least one music on-hold-compatible telephone system, a public address system or other audio and/or visual advertising device. Message playlists from the client computers can be sent via the server to the message playback devices by a communication link such as a radio paging system. The client computer is programmed to generate screens for guiding an operator to select messages from the library of messages and the order and times at which they are to be played by selected message playback devices. Message playback devices can be organized into one or more regions to allow a message playlist to be sent to more than one message playback device using a single radiopaging signal.

Most of the conventional message delivery systems are characterized by basic, simple systems in which on-hold messages are provided by mail as tapes or physical media. The previous efforts at online systems have required that special software be resident on the customer's computer. This has made it both difficult and expensive to change and alter on-hold messages.

A need exists for a system whereby the on-hold messages can be easily authored, selected and downloaded. A need also exists for a system by which on-hold messages can be easily downloaded onto an MP3 flash card format. Another need exists for an online system by which end users can easily access, upload, author and download on hold messages and by which end user customers can easily access and download on-hold messages.

A need exists for the ability to remotely control adjustable settings of playback devices. A need also exists for a playback device that can remotely connect to a server to obtain settings and content.

These and other objects of the present invention will become apparent from the detailed description which follows.

SUMMARY OF THE INVENTION

An audio content distribution control system for providing access to audio files at multiple locations via a telecommunications network is described. The system can include an interface by which an end user can access at least one audio file from an online database and a system for selecting at least one audio file from the online database for inclusion in a playlist.

The system can further include a plurality of playback devices located in multiple locations. The system can also feature means for transmitting the at least one audio file for playing on the plurality of playback devices in multiple locations. The system can be used to remotely control the adjustable settings of the playback device and to download settings modifications and newly selected audio content to the playback device from a remotely located server.

The audio content distribution control system provides an advantage over conventional audio content distribution systems in that it can be used to assign permission for audio content selection to multiple users located in multiple remote locations for distribution and playing in the same or different remote locations.

The audio content distribution control system provides an additional advantage in that it permits the administrator to play audio advertisements or informational messages related to the administrator's goods, services, and promotions on playback devices installed in multiple locations, but also permits the administrator to allow secondary users access to unassigned slots in the administrator's playlist so that the secondary users can select or upload each secondary user's own user-selected audio files related to advertising, informational messages, or other local topics relevant to the secondary user's location such as, for example, store hours, location, local sales, and manager's specials. These capabilities are particularly useful for franchisor-franchisee and manufacturer-dealer or supplier-dealer business relationships where the franchisor, manufacturer, or supplier is in a location that is remote from the location of the franchisee or dealer.

Still another advantage of the audio content distribution control system is that an administrator who is a retail store owner may generate revenue by selling advertising "slots" in the administrator's playlist to the retail store owner's vendors that provide products in the store, thereby allowing the vendors to advertise and promote their products in the store. The system allows the administrator to prevent each advertiser from modifying the advertisements or other audio content of any other advertiser while retaining full editing privileges for the administrator. Advertisers can use these features of the system to provide store-specific advertising content such as promotions for gift cards, gift registries, rewards programs, and the like.

Accordingly, the invention can feature a system for providing online access to on-hold messages. The system can include an interface by which an end user can access at least one on-hold message from an online database, and a system for downloading at least one message as a file to be played on an end user phone system.

The invention can also feature an audio content distribution control system for audio file distribution. The audio content distribution control system can include software, a computer, a server, a telecommunications network, and a playback device. The software can feature a user interface and software application features that permit multiple users to access and control the selection and distribution of a plurality of audio files. The computer can include a display device on which the user interface is viewable. The server can feature a master audio content database, wherein the master audio content database includes a plurality of audio files. The software can be installed on the server. The telecommunications network can communicatively connect to the computer and server. The playback device can download and play audio files, and is communicatively connected to the server.

In another aspect, the invention can feature the playback device being communicatively connectable to an audio system that includes speakers for playing the audio files downloaded by the playback device from the server.

In another aspect, the invention can feature the server being located remotely from the computer and the playback device.

In another aspect, the invention can feature the playback device being remotely communicatively connected to the server via the telecommunications network.

In another aspect, the invention can feature the playback device including remotely controllable adjustable control settings that can be controlled by a user via the user interface.

In another aspect, the invention can feature the adjustable control settings including at least one remotely controllable setting selected from among the following: shared access control settings in which user permissions are delegated, volume, messaging interval, subscription type, advertising content, shuffle mode, changing a background music channel, location setup information, advertising message selection, and any other functional setting of the playback device.

In another aspect, the invention can feature the playback device periodically communicatively connecting to the server via the telecommunications network to query whether any adjustable control settings of the system have been modified and whether any additional audio files have been added to a customer database in which a playlist is created and stored for playing audio files contained in that playlist on the playback device.

In another aspect, the invention can feature the playback device automatically downloading modified adjustable control settings and newly added audio files from the server for implementation and playing on the playback device.

In another aspect, the invention can feature the playback device being an integrated component of the computer.

In another aspect, the invention can feature at least one user being an administrator with electronic system privileges to change any adjustable control setting of the playback device.

In another aspect, the invention can feature at least one user being a secondary user granted predetermined limited rights to modify certain adjustable control settings of the playback device to which the administrator desires to grant access to the secondary user for the secondary user's customization.

In another aspect, the invention can feature the system creating a customer database in which a playlist is created and stored for playing on the playback device. The customer database can be unique to and accessible by one customer including the customer's at least one administrator user and at least one secondary user.

In another aspect, the invention can feature the playlist including preloaded audio files.

In another aspect, the invention can feature the playlist including audio files uploaded by the user.

In another aspect, the invention can feature the audio files including at least two items selected from among the following: music, audio books, advertisements, telephone messages, on-hold telephone messages, informational audio content, news audio content, or any other suitable audio content capable of playing on the playback device.

In another aspect, the invention can feature the playlist stored in the customer database being created by selecting audio files stored in the master audio content database or by uploading audio files to the system via the computer and user interface.

In another aspect, the invention can feature uploaded audio files being electronically transmitted from the computer to the server for storage in the customer database.

In another aspect, the invention can feature the playlist including a number of unassigned slots into which audio files are electronically insertable for playing as the playlist is played by the playback device. The number of such unassigned slots can be determined by the administrator.

In another aspect, the invention can feature the system including a slot assignment control feature by which the administrator can assign audio file selection privileges for the unassigned slot to at least one secondary user.

In another aspect, the invention can feature the system being programmed to the play the audio files in the playlist in a repeating loop.

In another aspect, the invention can feature a plurality of the playback devices being installed remotely from the server and receiving the playlist and its audio files for playing via electronic transmission over the telecommunications network.

In another aspect, the invention can feature one adjustable control setting being a cloning tool that copies settings and audio files of one playback device modified by the user for use with one or more other playback devices.

In another aspect, the invention can feature unassigned slots in a playlist being assignable to more than one secondary user for playing in a playlist of one of the playback devices.

The invention can also feature a method for distributing audio files selected by multiple users to multiple locations. The method can include the steps of: (a) providing a master audio content database including audio files that are selectable for inclusion in one or more unassigned slots of a playlist stored in a customer database; (b) registering an administrator account to be controlled by an administrator; (c) creating at least one secondary user account to be accessed and modified by the at least one secondary user; (d) allowing the at least one secondary user to access the master audio content database and select one or more audio files for inclusion in one or more the unassigned slots of the playlist; and (e) electronically transmitting the playlist to at least one playback device for playing in at least one location.

In another aspect, step (d) of the method can also feature the step of assigning each of the one or more unassigned slots of the playlist to one of the at least one secondary users to allow the assigned secondary user to insert advertisements for playing in the assigned secondary user's assigned slot in the playlist.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

Figure 14:
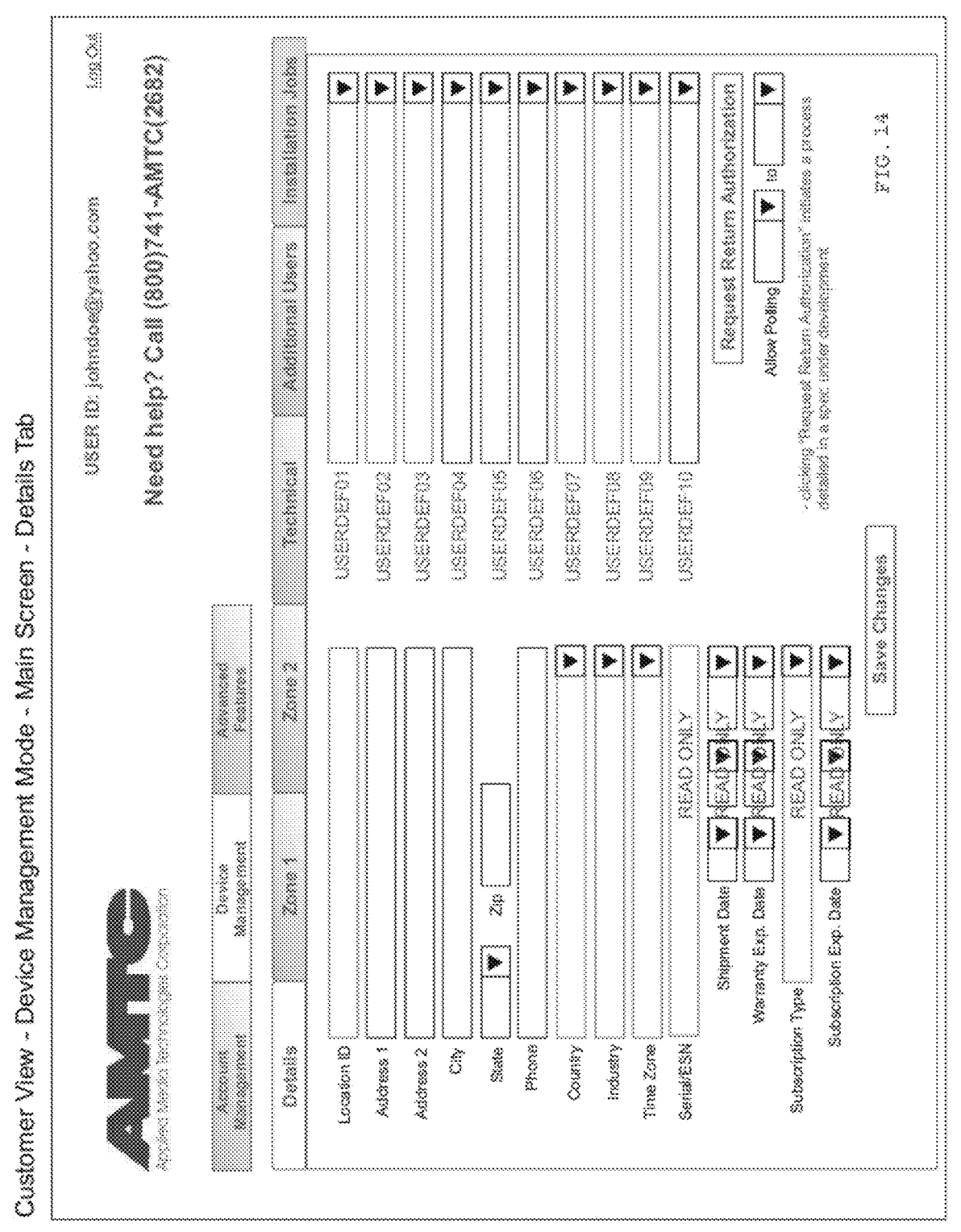

FIG. 14 is a screen shot view of a music genre channel selection page of the user interface of the audio content distribution control system.

FIGS. 17-43 are screen shot views of the audio content distribution control system.

DETAILED DESCRIPTION

The present invention is described with reference to the enclosed Figures wherein the same numbers are utilized where applicable. The present invention comprises a system whereby messages to be played on hold recorded can be selected and created online and rapidly downloaded as a playable file and preferably via an MP3 Flash Card. In a most preferred embodiment, the invention comprises an interface whereby an end user can sign up for the services and place in or upload a plurality of prospective on-hold messages.

Figure 1:
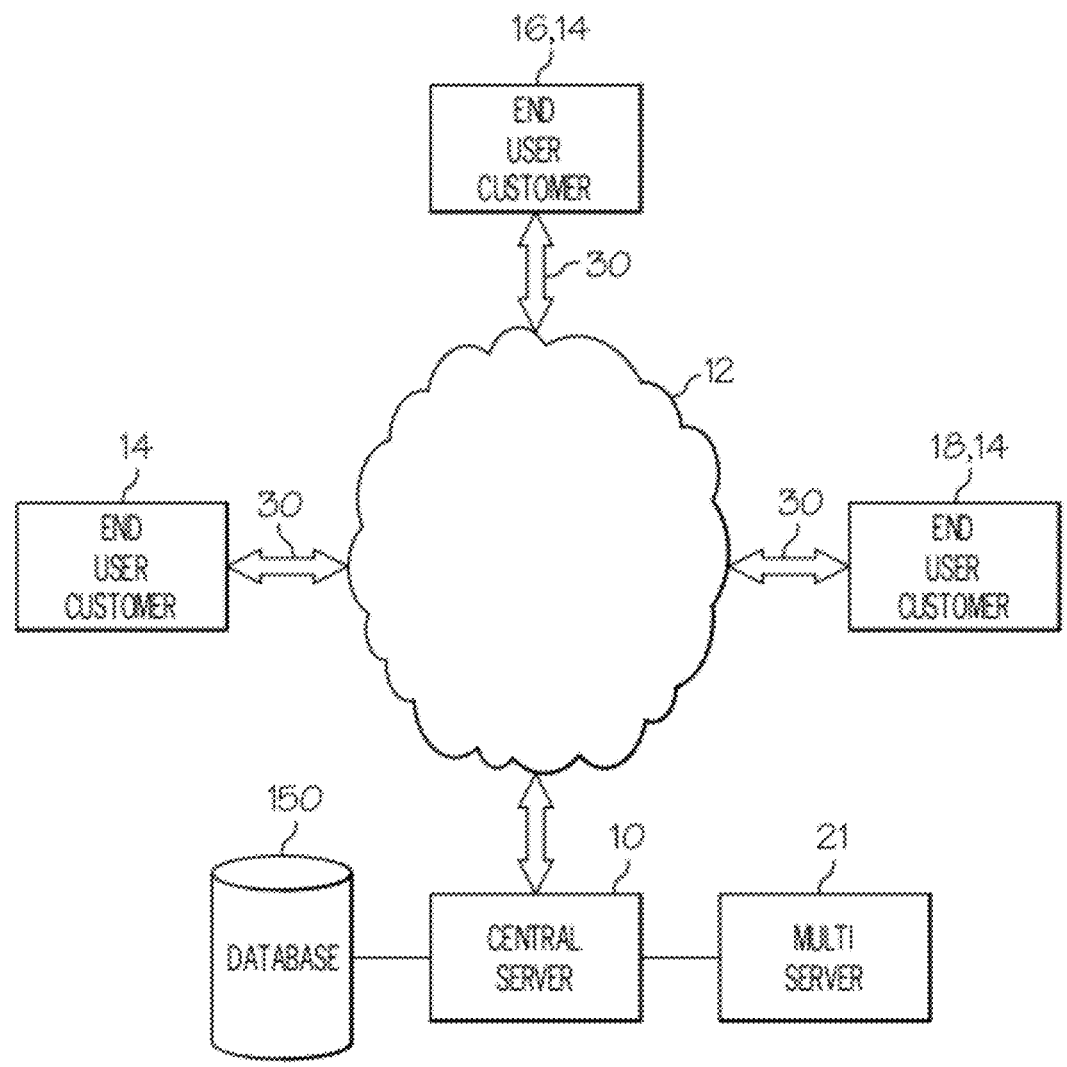
FIG. 1 is an overview block diagram of the system.

Referring to FIG. 1, a most preferred embodiment of the present invention is disclosed and shown. The most preferred embodiment comprises a central computer server 10 connected by a computer network 12 to remote end user stations 14. The central server connects to a database 150. As will be discussed herein, the database 150 will include data related to end users and their respective on-hold messages.

In a preferred embodiment, end user stations 14 comprise a plurality of end users 16, 18. End users 16, 18 are defined herein as entities linked to the system who comprise companies and individuals who desire to upload, author or download on-hold messages. Users 16, 18 are linked with the central computer server 10 via a transport medium 30. End users 16, 18 will typically comprise companies, professionals and individuals that desire to create, access and download on hold messages. In a most preferred embodiment, will be linked via a global computer network 12 such as the Internet or Worldwide web, but other embodiments including LANs, WANs and Intranets, which fulfill the spirit and scope of the present invention.

The end user devices 16, 18 will typically comprise any device that connects to the system via the Internet or other IP transport methods and includes, but is not limited to, such devices as televisions, computers, hand-held devices, cellular phones, land based telephones, wireless electronic devices and any device which uses a transport medium 30. Non-limiting examples of a transport medium 30 applicable for use in the present invention comprise any backbone or link such as an ATM link, FDDI link, satellite link, cable, cellular, twisted pair, fiber optic, broadcast wireless network, the internet, the world wide web, local area network (LAN), wide area network (WAN), or any other kind of intranet environment such a standard Ethernet link. In such alternative cases, the end user will communicate with the system using protocols appropriate to the network to which that client is attached. All such embodiments and equivalents thereof are intended to be within the scope of the present invention.

Referring again to FIG. 1, the present invention may comprise a multi-server 21 environment which comprises a computer system in accordance with the present invention that allows the multiple end users 16, 18 to communicate with the system. Through communication link and transport medium 30, end user customers and end users 16, 18 are linked to the central server 12, preferably by a customizable interface to be described in greater detail below.

Figure 2:
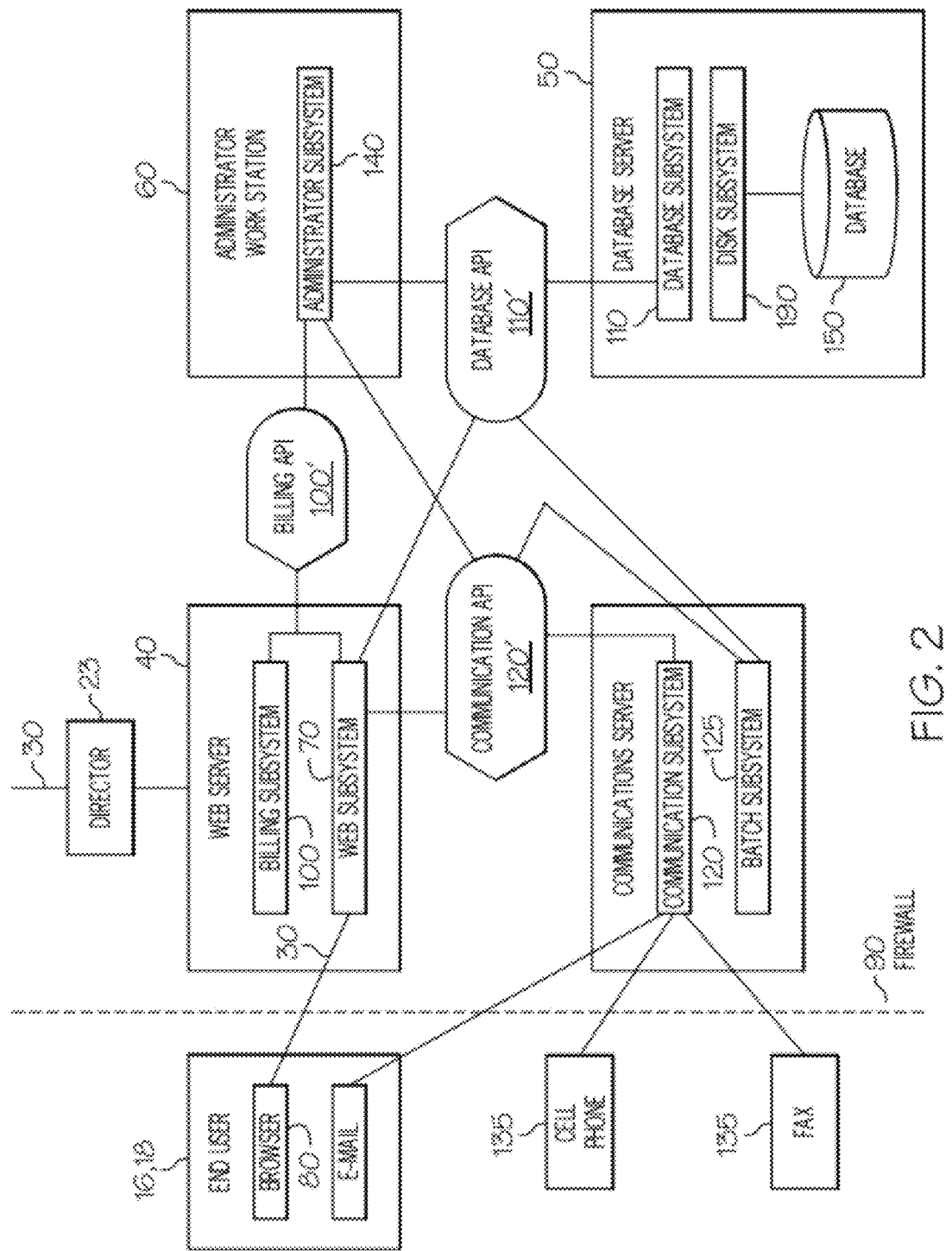
FIG. 2 is a detailed diagram of the system.
Figure 3:
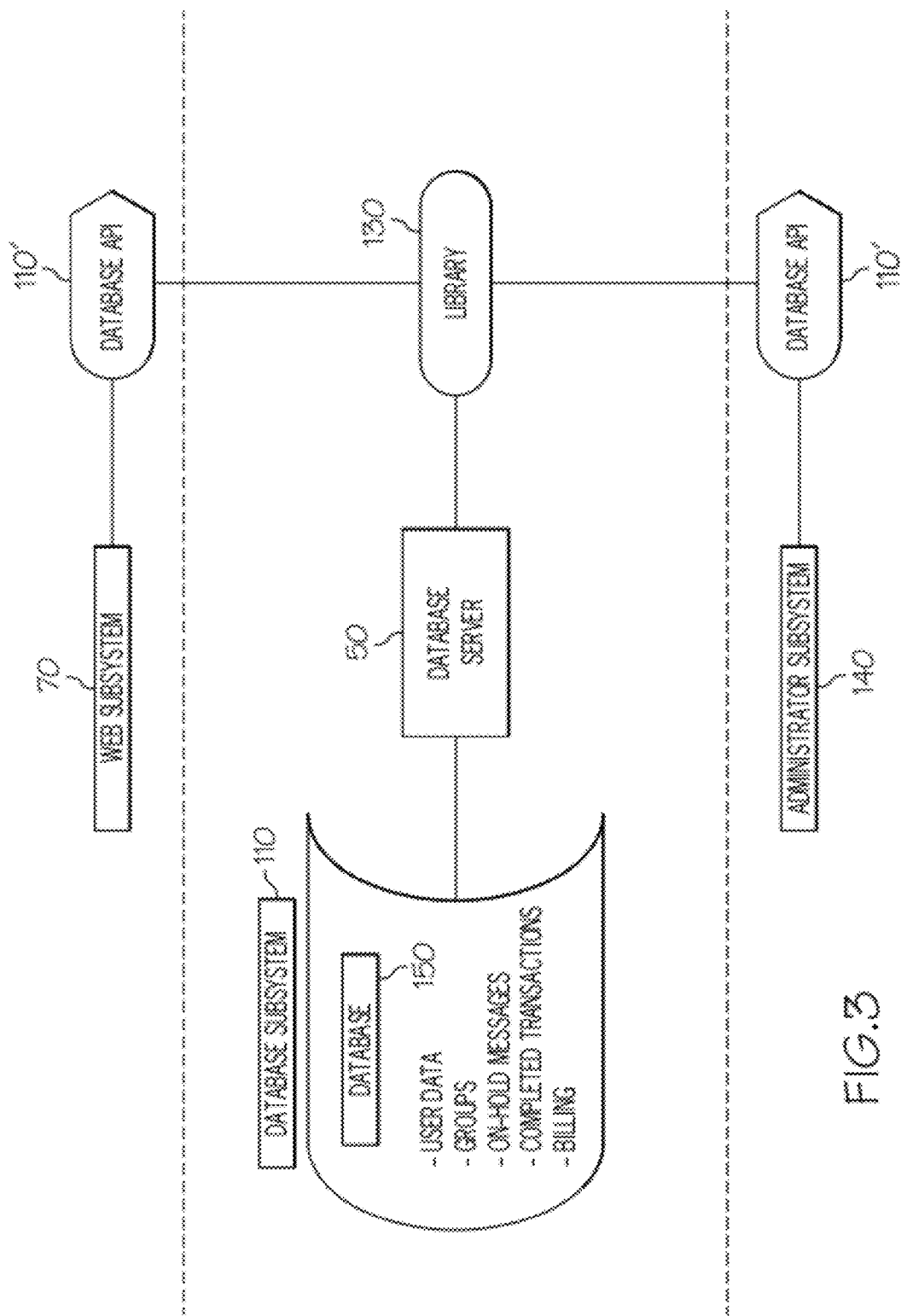
FIG. 3 illustrates the database architecture of the present invention.

Referring to FIGS. 2 and 3, the central server and database systems of the present invention are now shown and described in greater detail. A local director 23 routes signals through the system to the various servers, to be described below, and to and through transport medium 30 to end users 16, 18. The system preferably includes two primary servers, a web server 40 and a database server 50 which may operate using such database platforms as SQL server or Oracle. The system may operate under other platforms such as ASP and JAVA (e.g. J2EE) Hence, in one embodiment the SQL server may run SQL server database management software from Microsoft Corporation.

Alternatively, the server can further comprise an Oracle database server. The system further includes an administrative work station 60 or system which provides the administrative capabilities and monitoring for the system under the control of an administrative subsystem 140. The administrative work station 60 allows administrators or other operators to perform routine operations which affect the entire system. Such operations include, but are not limited to, administering the accounts of end users 16, 18 monitoring the traffic through the system, the tabulating of user balances and ratings, printing reports and maintaining the programs that comprise the overall system as well as uploading new on-hold files.

A web subsystem 70 is responsible for all interactions with a web browser 80 in the end user devices 16, 18 and serves as the end user interface to the system. All interactions between the end user devices 16, 18 and the database subsystem occur through the web subsystem 70. Internet Information Server 200 (IIS) by Microsoft Corporation is an exemplary web server software system 70 in accordance with the present invention, although the present invention is in no way limited to this system. The expression of the user interface presented to end users 16, 18 in their client devices may be implemented as HTML or other high level computer language or technology, and may be displayed in a standard web browser.

All world wide web systems listed above are preferably communicated, for example, by an Ethernet 100 base T network and a switching hub. In addition, a second isolated network segment will preferably exist between the web server 40 and the external communications hardware (e.g. internet router). Such a system will keep external traffic isolated from the internal network, as well as provide a dedicated connection between the web server 40 and the Internet for maximum throughput. The systems will have an initial configuration of random access memory for the web server 40 and preferably at least 128 megabits for the database server 50, both having the capability to expand.

The web server 40 may be a point of entry to the entire system. The system determines the identity of the user 16, 18 and makes appropriate decisions while serving web pages to the end user 16, 18. The web server 40 sends HTML, XML, JAVA, or other high level computer language to the end user work stations 16, 18, validates passwords, sends logging and transaction information to the database server 50, and performs logical operations, thus behaving as a transactional server.

As noted above, in one embodiment, the server operating system may be a Windows NT server, a multi-platform operating system provided by Microsoft Corporation. The Sun Microsystems Solaris is an alternative embodiment. The server typically includes IIS, which is a completely integrated Internet application platform. IIS includes a high-performance web server, an application development environment, integrated full-text searching, multi-media streaming and site management tools. The security infrastructure is integrated within the server, thus enabling an easy-to-maintain and highly-secure web development and deployment environment. It is to be appreciated that the invention envisions new and expanding technologies.

The operators of the central system may create, delete and update account information by utilizing the administrative subsystem 140 in administration work station 60. A billing subsystem 100 is used for crediting and debiting end user accounts.

Database 110, communication 120 and billing 100 subsystems thus execute essential services for the other parts of the system, and will therefore have well-defined application program interfaces (API) 110', 120', 100', as is well recognized by those with skill in the art. The system will preferably be protected for the Internet by a "firewall" 90 which is a safety precaution, and important with respect to the present invention due to the sensitive and confidential nature of the information in the database. As will be discussed below, firewall 90 plays an important and critical role in the present invention because of the confidentiality of the data associated with some applications of the present invention.

In a preferred embodiment, the database subsystem 110 stores all pertinent information related to user accounts, administrator accounts, payments and messages, as well as general dynamic system information. All interactions with the database subsystem 110 are performed through a database API 110' which may define the interface to a library of stored procedures 130. These are used to implement high-level database functions and to shield the details of the database implementation from the other subsystems. The database subsystem 110 is preferably implemented using database server 50.

The administration subsystem 140 provides an interface for operators and managers of the system to modify the database, print reports, view system data and log user comments and complaints. The administration subsystem 140 provides a collection of access forms, queries, reports and modules to implement the administration interface. Administrators typically will have the power within the system to force most actions. The administration subsystem 140 will interact with the communications, database and billing subsystems.

The communications subsystem 120 interfaced to a communications API 120' will be used to email and contact end users 16, 18. End users 16, 18 may be notified by phone, fax, email or pager, or other communications devices which can be contacted by the system 135. End users 16, 18 will also have a password accessed section of a website where they can access on-hold messages and obtain detailed reports.

A batch subsystem 125 may periodically send out grouped notifications. It will access the database subsystem 110 to determine what notifications are required, and uses the communication subsystem 120 to make those notifications. A group notification may comprise a special premium offered to end users 16, 18. The billing subsystem 100 will be used to verify and bill credit cards and communicate through the billing API 100' to the administration subsystem 140, and potentially to an outside billing and verification service which could be used to perform the billing functions.

Referring to FIG. 3, the database server 50 which implements the database subsystem 110 of the present invention comprises a server that maintains all associated logging and transaction information for the system. Through the database 150 (which is backed up by a backup database for safety purposes), the database server 50 logs information regarding the end user customers and their respective on-hold messages, maintains user account information, maintains account balances, produces and prints reports, hosts backup operations and performs statistical calculations for the entire system.

Figure 4:
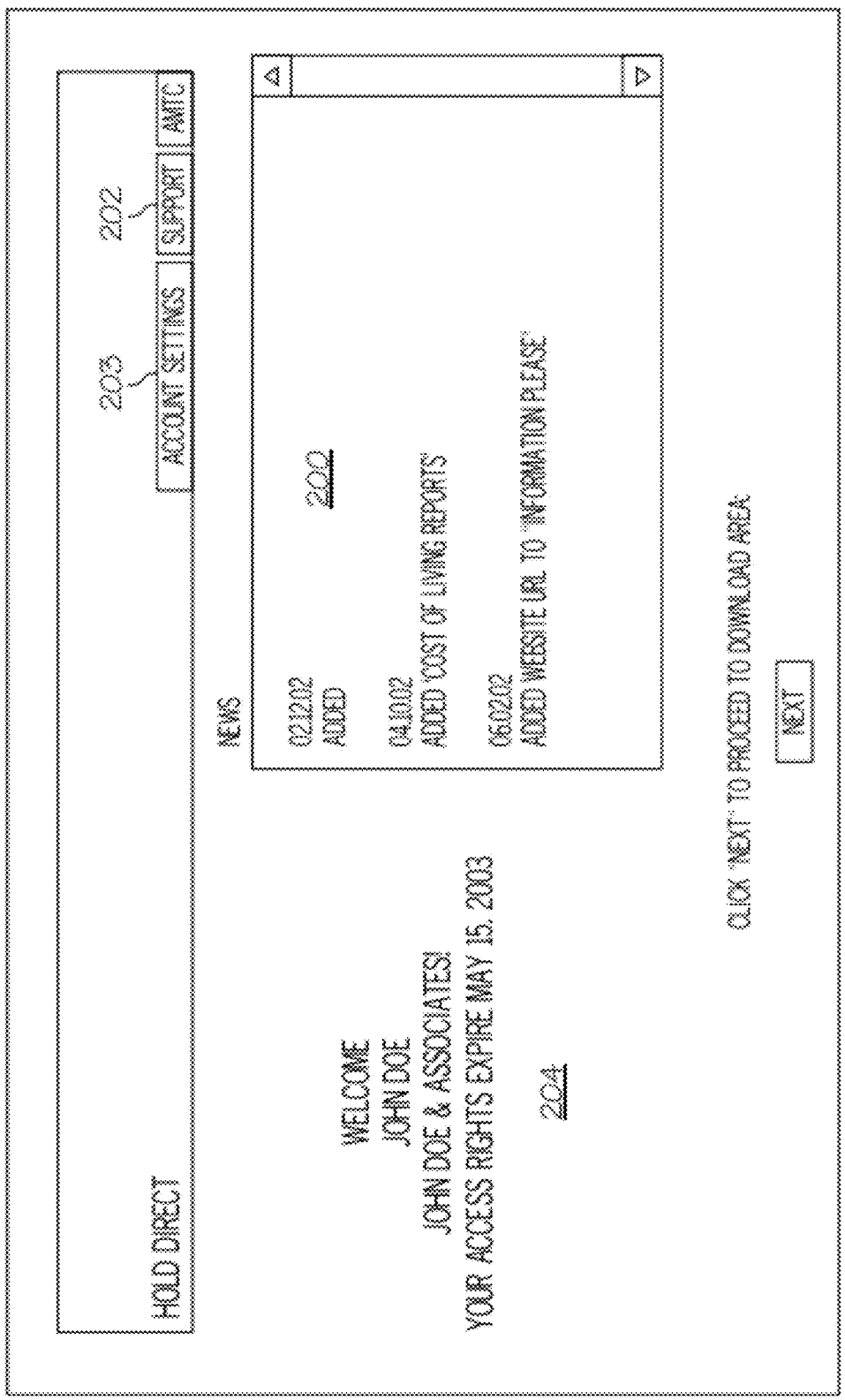
FIGS. 4 to 8 illustrate computer interface for use in the present invention.

The database server 50 is preferably a dual processor computer microprocessor. Each connection to the database 150 and its associated work may be handled by a separate thread within the database server 50 process space. It is anticipated that a dual processor machine is sufficient for the type and amount of transactions that it will be performing, however if it proves insufficient, the database can be "striped" to two or more machines to distribute the server load. With the above describing the operational background of the invention, referring to FIGS. 4 to 8, the present invention is described in the context of an online system for accessing/authoring and downloading on-hold messages. As shown in FIG. 4, the system comprises an initial homepage.

The homepage may be the homepage of a website such as HoldDirect.com, assignee of the present invention. The homepage will illustrate information such as news 200, and buttons for support 202 and account settings 203. The home page may be personalized for the user 204.

In one embodiment, the system comprises a system whereby end users, customers and companies who desire on-hold messages can easily access those messages from a remote web server. In a most preferred embodiment, the on-hold messages are downloaded onto a compact flash card and then played on a player system associated with the telephone system. The flash card is designed to work with a system that stores and plays stored phone messages in association with the phone system.

Figure 5:
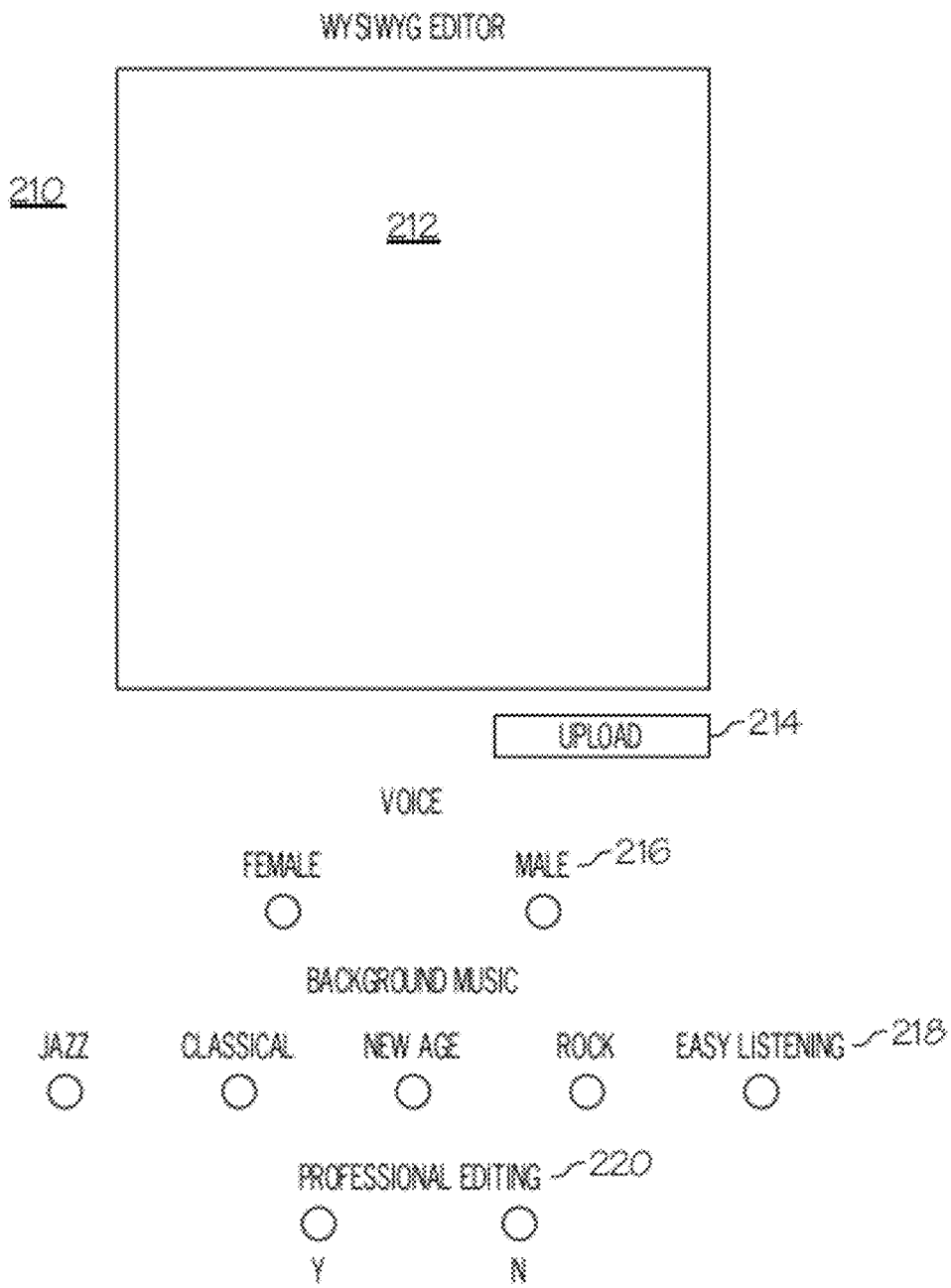

As shown in FIG. 5, the user is presented with a series of user screens in which he or she can complete a number of tasks related to the creation, editing and downloading of on-hold messages. The screen has a location for creating a script 210. The script can be composed online 212 or uploaded as a file 214. The end user can also input requests that the script be recorded by a male or female 216. The end user customer can also select the type of background music 218 which is to be used with the upload or created presentation. Examples of the types of background music include jazz, classical, new age, pop or rock, or easy listening 218. The message may or may not be professionally edited 220 according to the request of the end user. This may also be a billed service and thus tracked by the billing subsystem 110.

Figure 6:
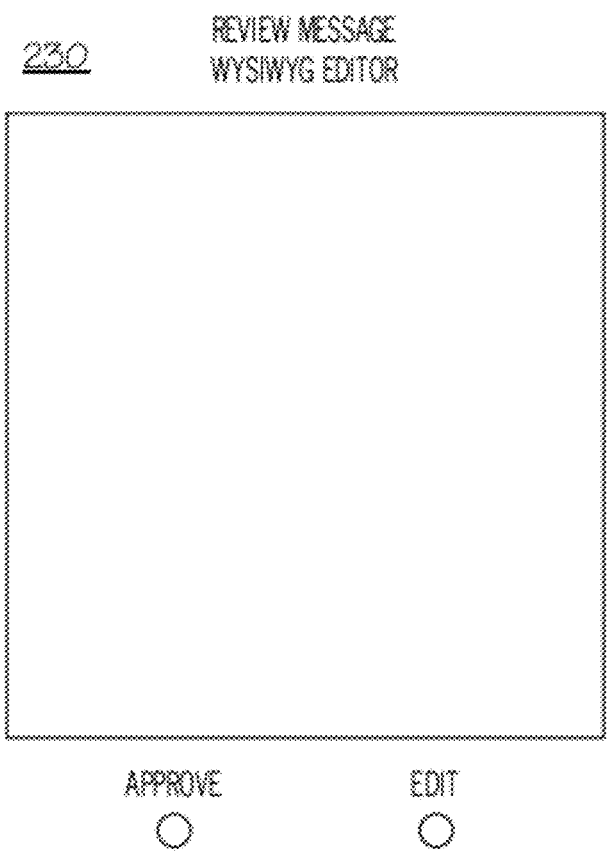

After the message request is authored or uploaded as shown in FIG. 5, the end user will receive a message via email or other notification mechanism (e.g. phone or fax) informing him or her that this message has been created and is ready for review and approval prior to recordation and the addition of music. Referring to FIG. 6, the end user can then go online, enter a secure server, review the message and then approve or edit it using 230, for example, a WYSIWYG editor. After the message is finally approved, it is recorded by the requested male or female voice and the requested background music is added as noted above.

Figure 7:
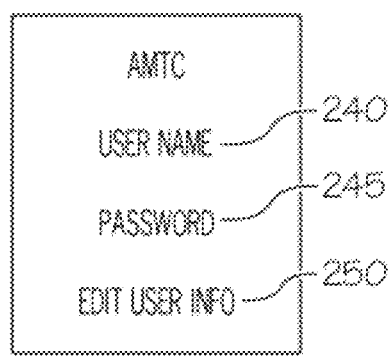

Referring to FIG. 7, it is to be emphasized that in a preferred system, access is password protected. When a customer initially is provided access to the system, he is provided a default login 240 and password 245. The password may be an automatically generated record ID. The system may manually set the access expiration date. The user will typically be notified of the initial login and password so he could gain access. The user could change request to edit information 250 via an accounts settings screen.

If the end user is new to the system, the option may include an online payment option which will then be activated and associated with the billing subsystem 110. A user would sign up for the service and renew via a commonly known payment method such as Visa, MasterCard, Amex, Discover, PayPal, etc.

Each audio file will therefore have a record in the database 150. The record will contain the title of the file and the full text of the narration contained in the file and will identify a "group" to which the record belongs. Groupings may be based upon the types of recordings. For example, Groups may include seasonal messages, directions to the business, or specific product or service offerings.

In operation, the end user customer 16, 18 will login and be presented with the titles of the audio records available to him, as determined by his end user configuration. The end user may select the files the user wishes to download and a local destination drive on his machine. The user can then copy the desired files from the local drive to a compact flash card using, for example, a USB card writer peripheral device. Because the flash card writer will appear as a local drive, the user may be able to download directly to the compact flash card.

Figure 8:
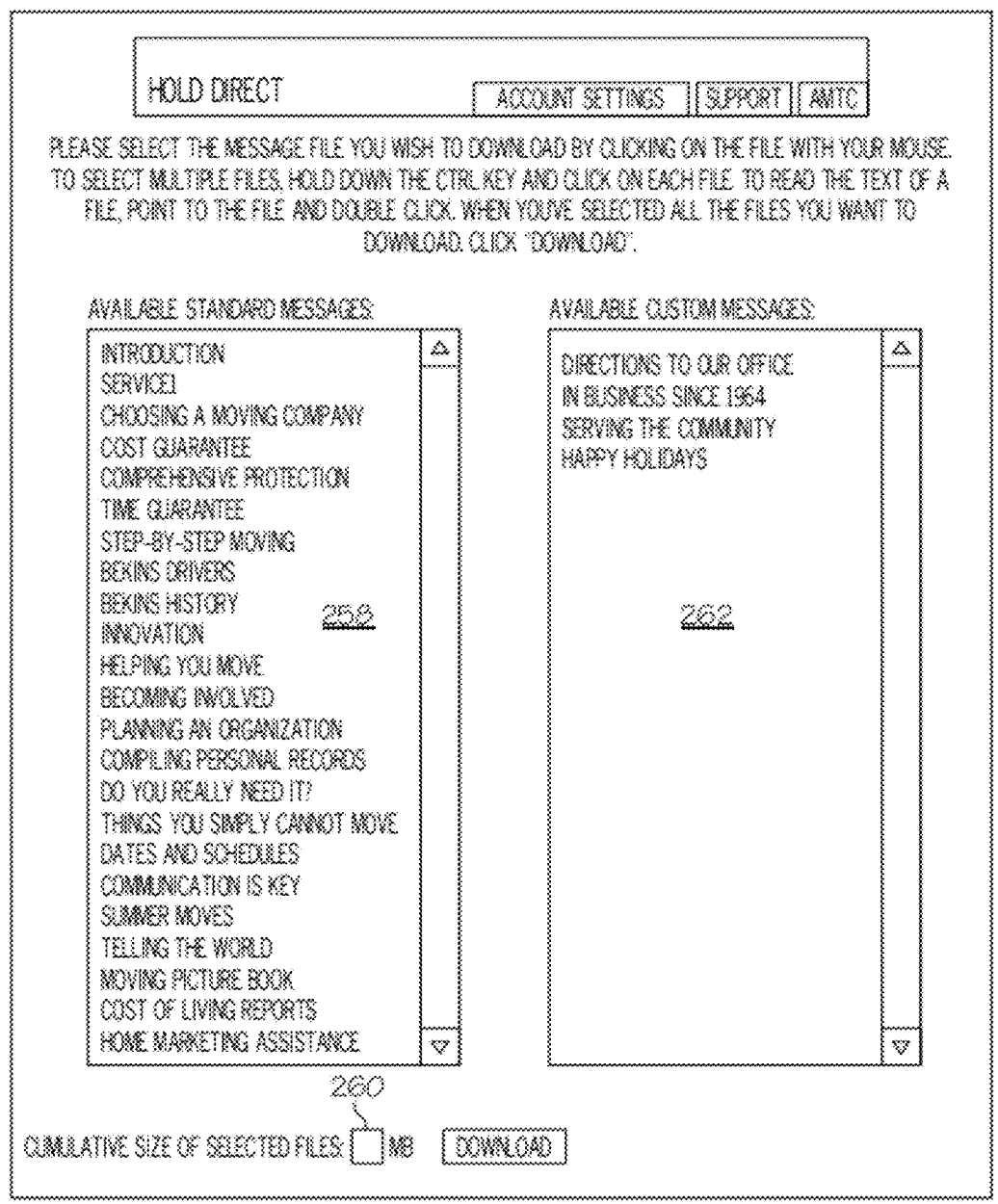

More specifically, as shown in FIG. 8, the system for accessing and downloading files is shown in detail in the context of a series of on-hold messages for a fictional "Moving Company." The user highlights one or more files from the left and/or right windows of screen using standard Windows. As files are selected 258, the cumulative total size of all files selected is displayed as shown 260. Users will be able to use compact flash cards of any desired capacity. This permits users to keep track of their running total for the selected files, to make sure they don't select more than their flash card can hold. Custom messages 262 are provided as well.

When a user double-clicks a file, a popup window displays the filename and text for that file. The user may then click the "Next" button so that the "Save to" screen appears to allow the user to designate the local destination drive for the files. To stop users from playing MP3 files downloaded from other sources, and to prevent the sharing of files between owners of our players, the MP3 files will be encrypted so they can only be played on the user's specific player. This encryption will be performed by a separate program. When the user clicks "Download" on the download screen, the system queries a 6-digit player serial number and sends this serial number along with the selected files to the encryption program, which will encrypt the MP3 data with the 6-digit serial number.

Figure 9:
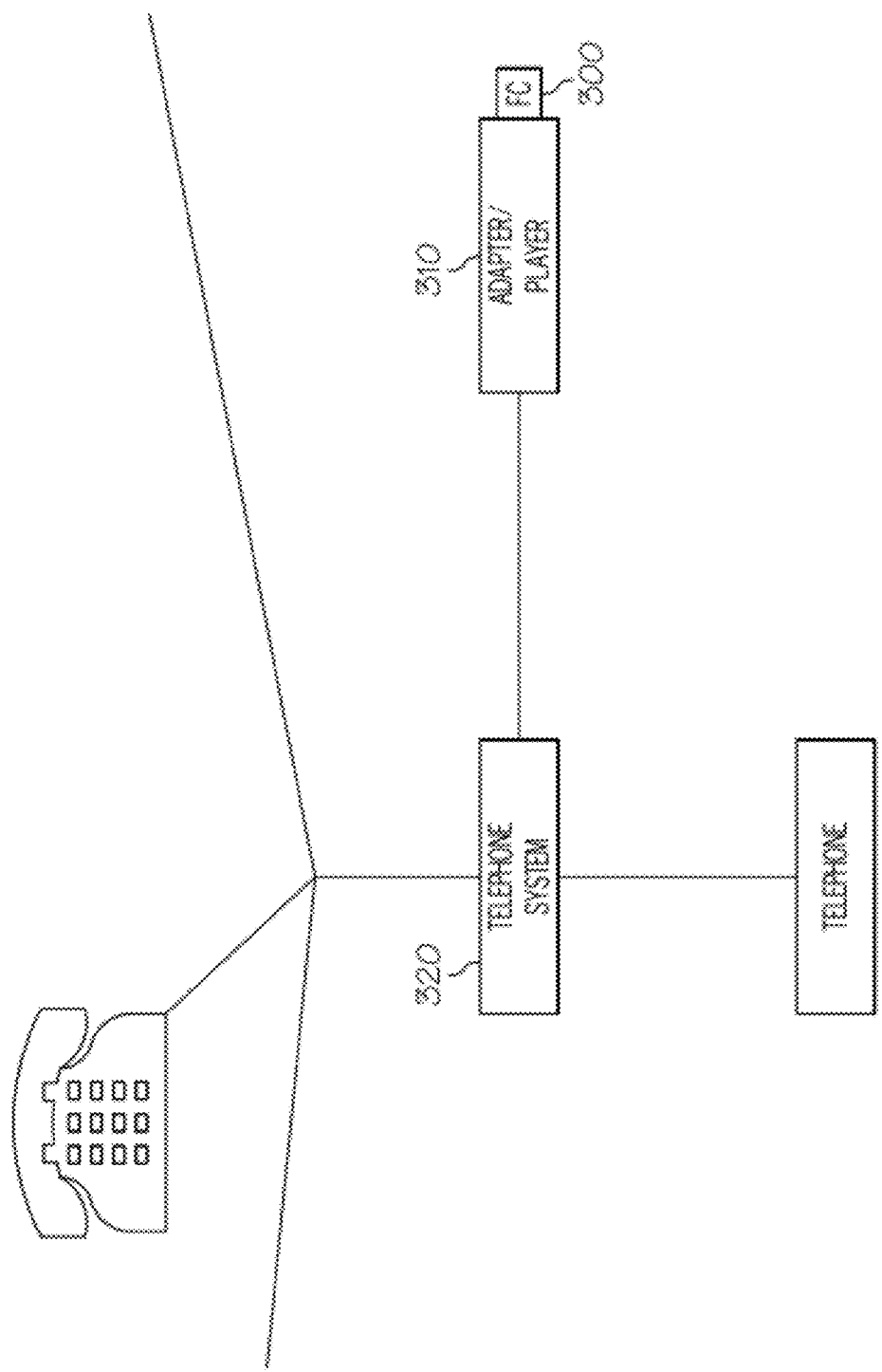
FIG. 9 is a diagram of the present invention used with a telephone system.

The new, encrypted files are "returned" to the downloading application and are sent online to the user and copied on to the compact flash card 308. A typical "downloading progress" gauge may be displayed during encryption/downloading, and a "complete" message displayed at conclusion, with two buttons available for the user to select "Download more files" (which would simply close the download screen, revealing the file download page again) or "logout" as shown in FIG. 9. The card then is inserted into a player/adaptor 310 which is associated with the telephone system 320 and which activates when customers are placed on hold.

Figure 10A:
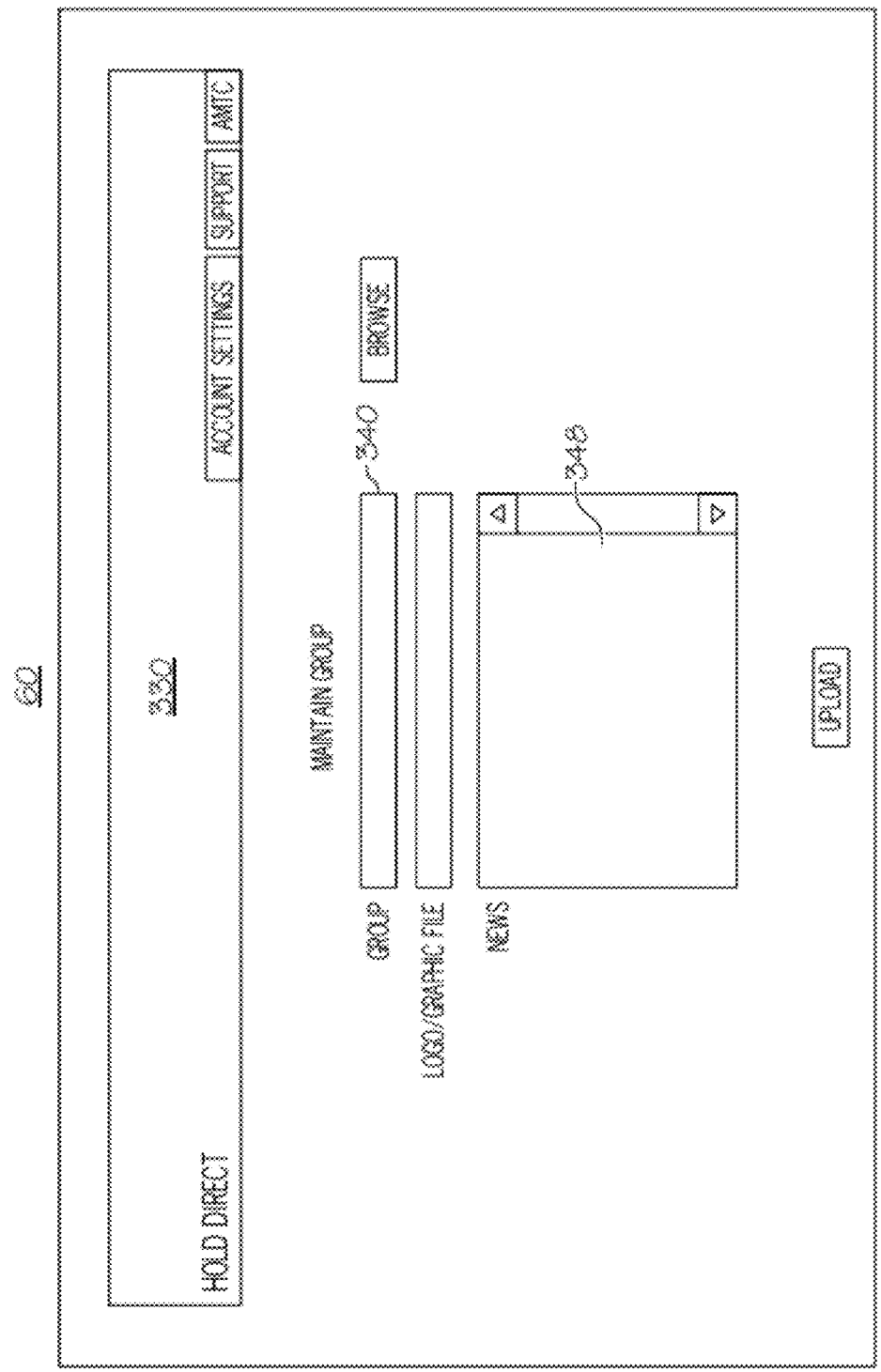
FIGS. 10a and 10b illustrate user screens for use in conjunction with the administration system of the invention.

The administrator station 60 is now more fully described. FIG. 10*a* illustrates a screen for maintaining a group 330. The administrator may be prompted to either enter a group or select it from a drop list 340. If no database record for the group exists, administrator may either enter a path/filename of a logo graphic or select it using a standard browse feature. The administrator station 60 may access an input screen 348 that allows administrator to type your news item, which can be posted on a greeting page at the end of any existing news, stamping the data automatically. After some preset period of time old news could be timed for automatic removal.

Figure 10B:
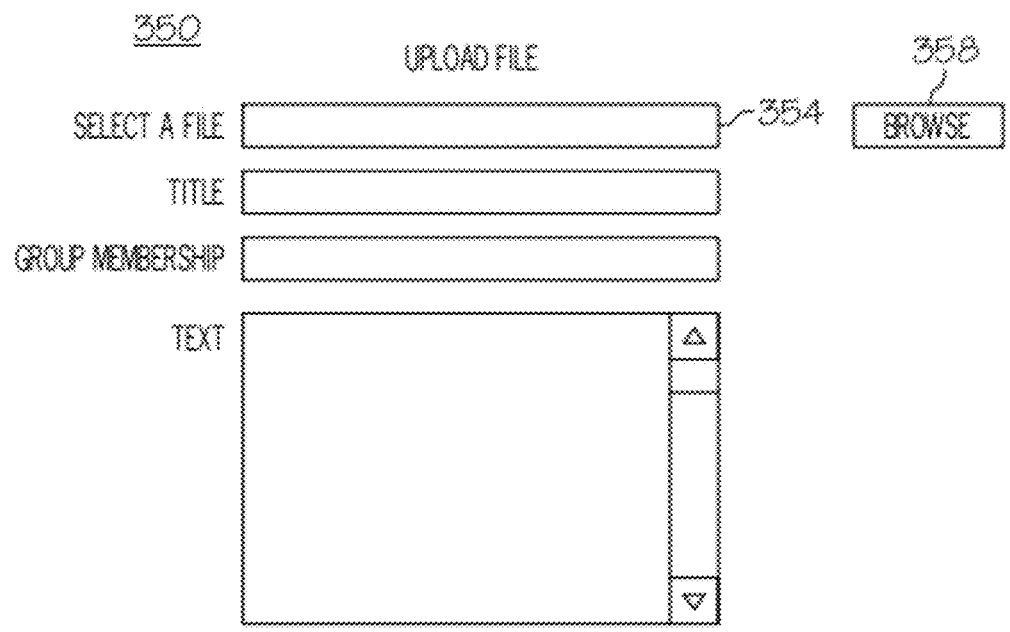

FIG. 10*b* illustrates a file uploading screen 350. The administrator may either enter the path/filename of the audio file to be uploaded 354 or select it using a standard browse feature 358. The administrator may further enter a descriptive title for the file. The administrator selects the group membership for the file from a drop list. The administrator then enters the text of file. The administrator clicks the "Upload" button. A new audio file record will therefore be created in the database.

Audio Content Distribution Control

Figure 11:
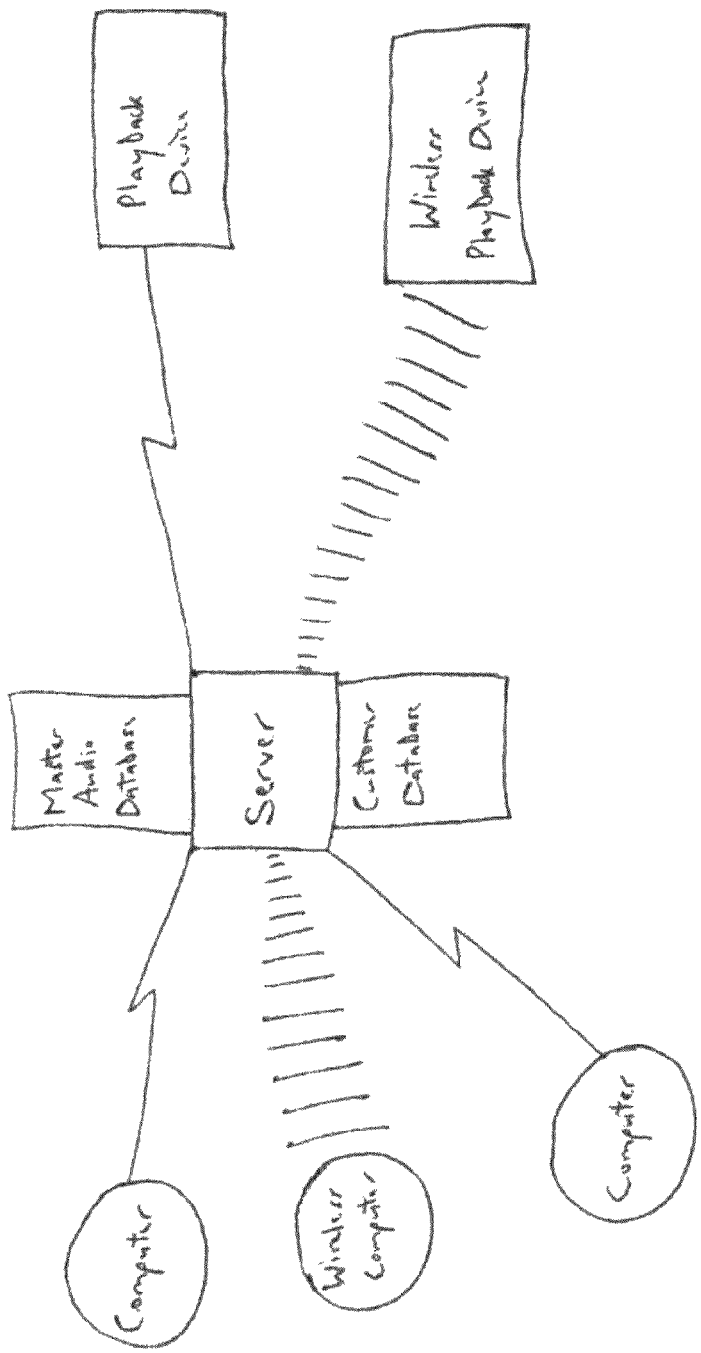
FIG. 11 is a schematic diagram of an audio content distribution control system.
Figure 12:
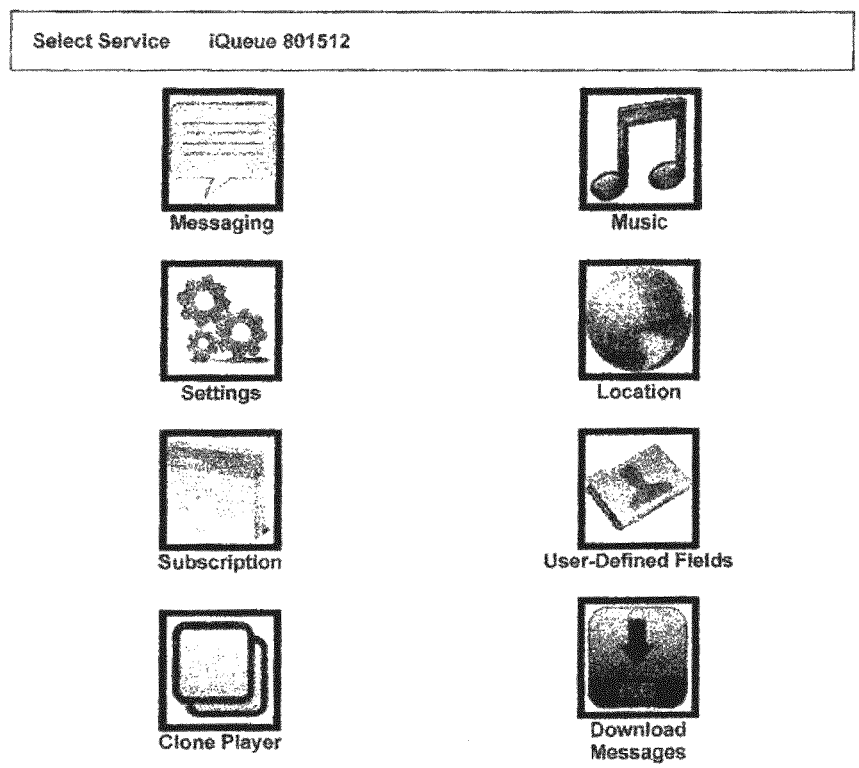
FIG. 12 is a screen shot view of an adjustable control settings page of the user interface of the audio content distribution control system.
Figure 13:
FIG. 13 is a screen shot view of an audio file selection page of the user interface of the audio content distribution control system.
Figure 15:
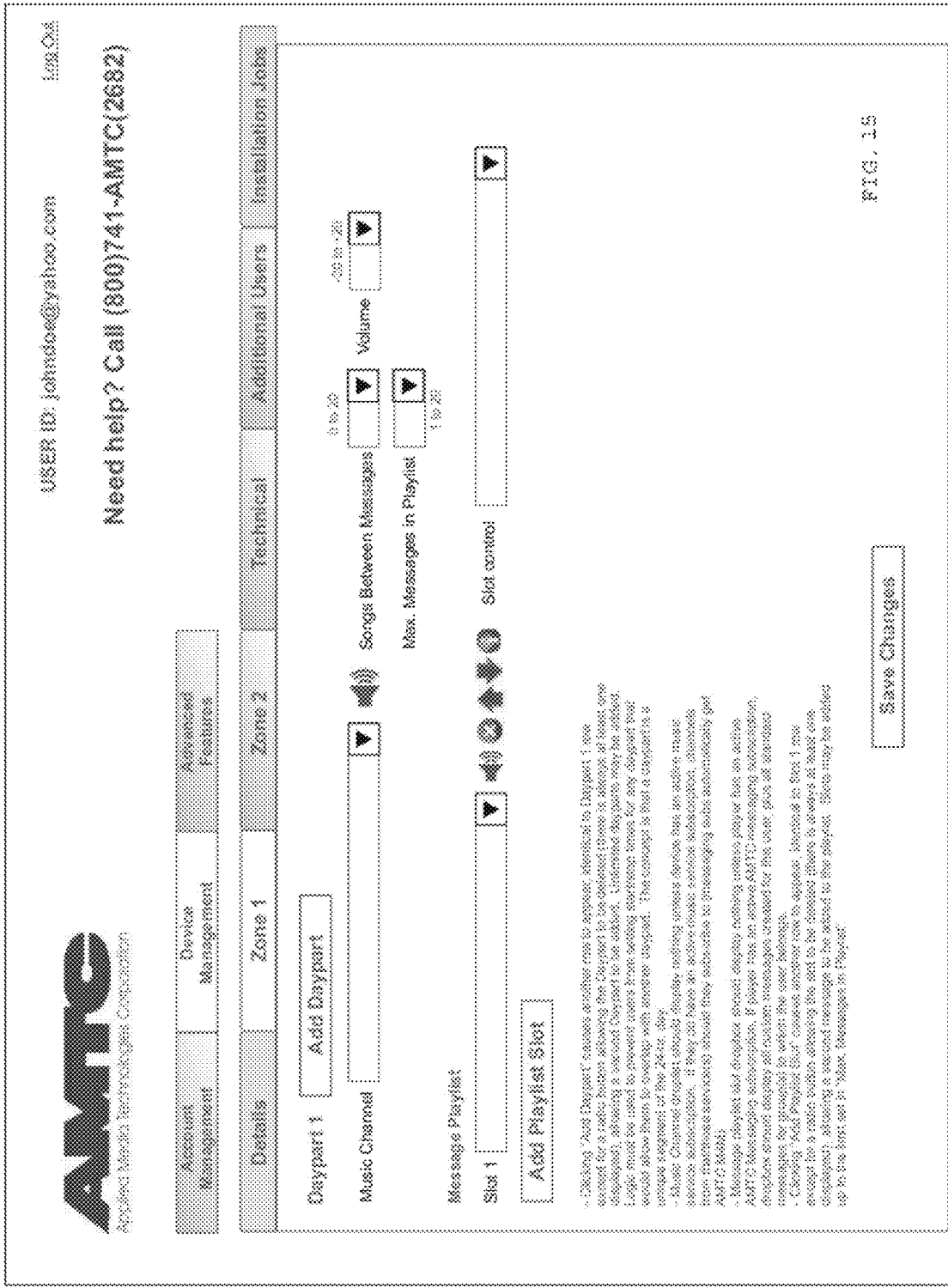
FIG. 15 is a screen shot view of a permissions and playlist editing page of the user interface of the audio content distribution control system for a playback device.
Figure 16:
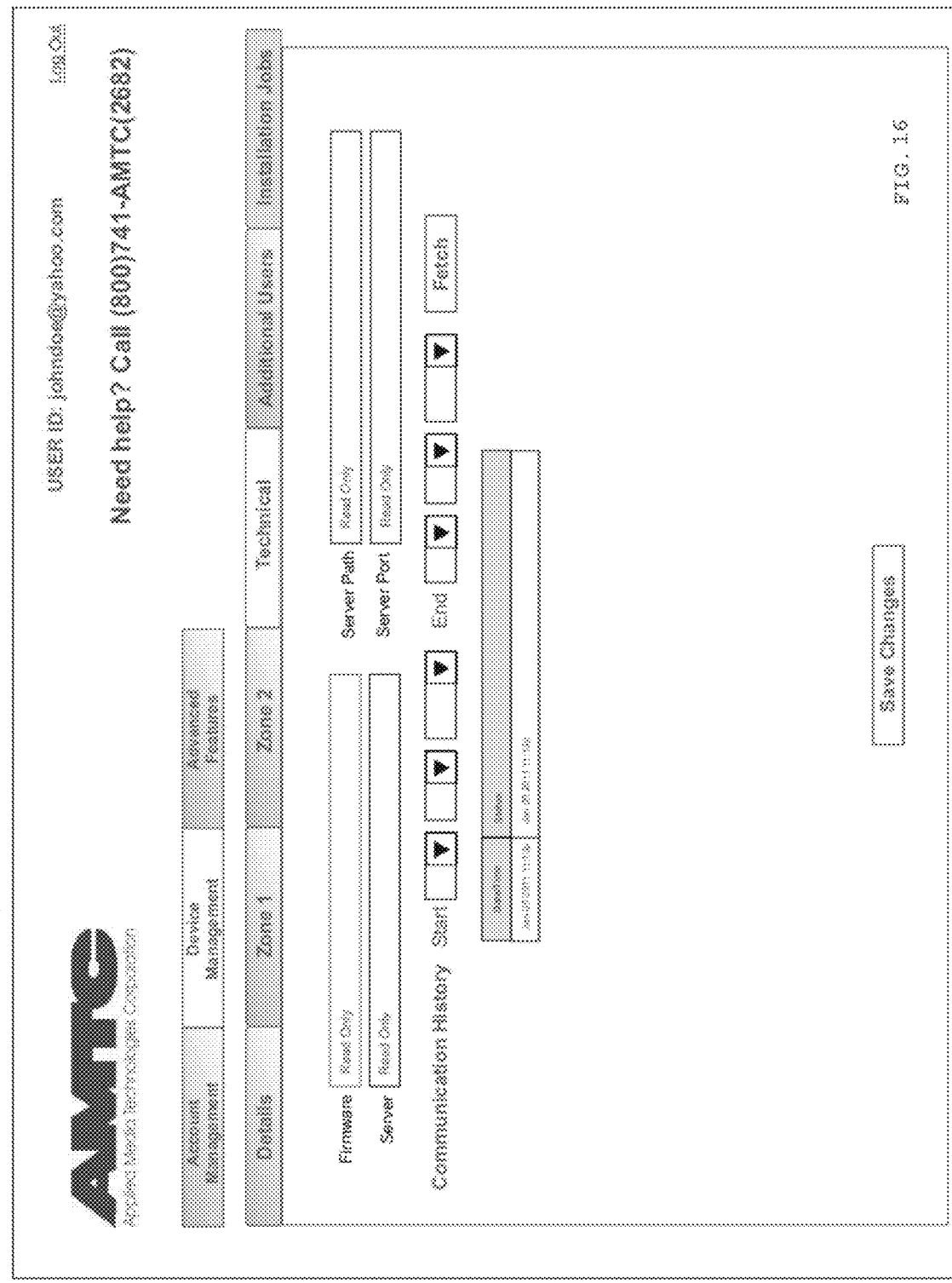
FIG. 16 is a screen shot view of a cloning tool page of the user interface of the audio content distribution control system for a playback device.
Figure 18:
Figure 22:
Figure 23:
Figure 26:
Figure 27:
Figure 31:
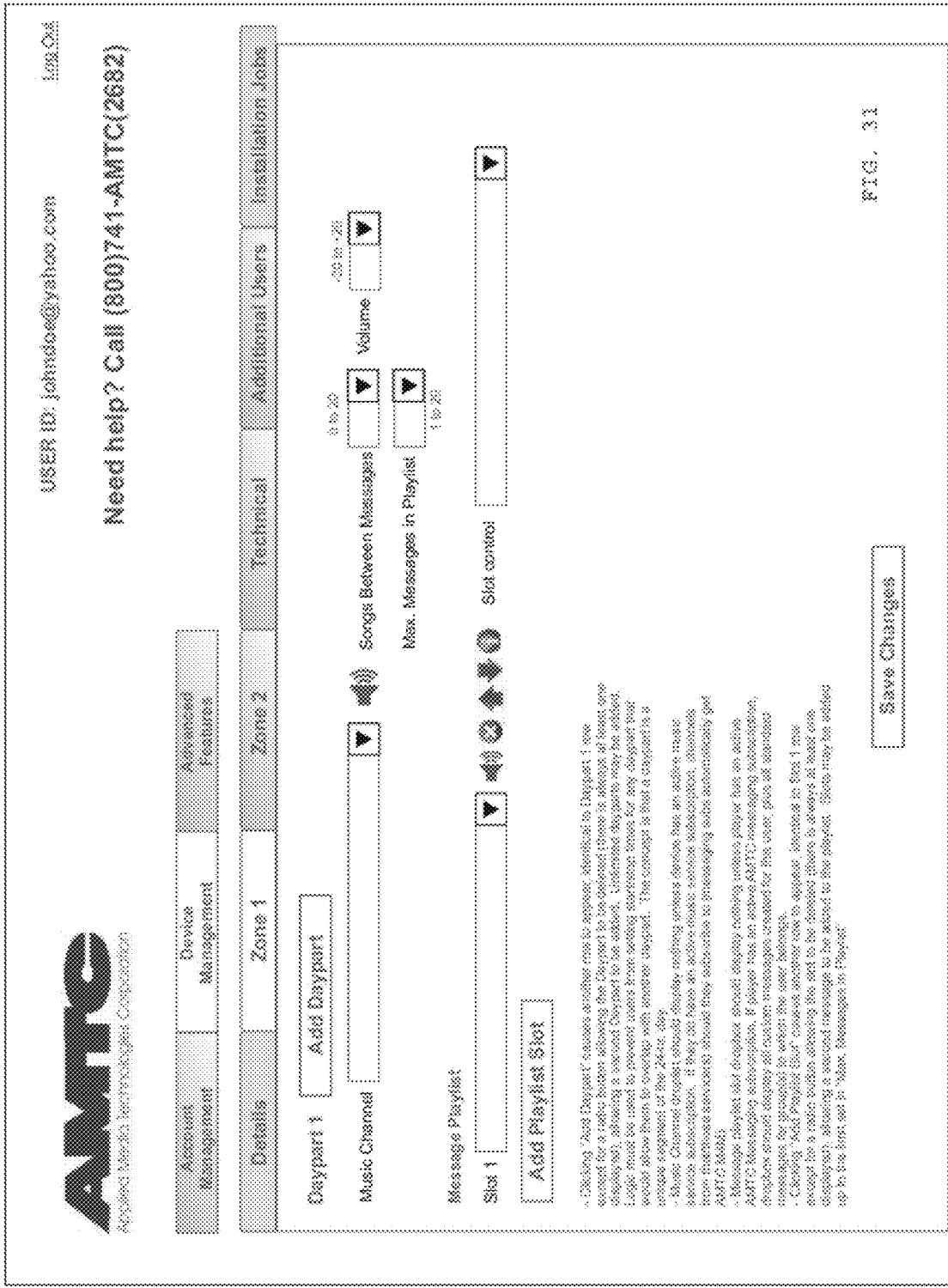
Figure 32:
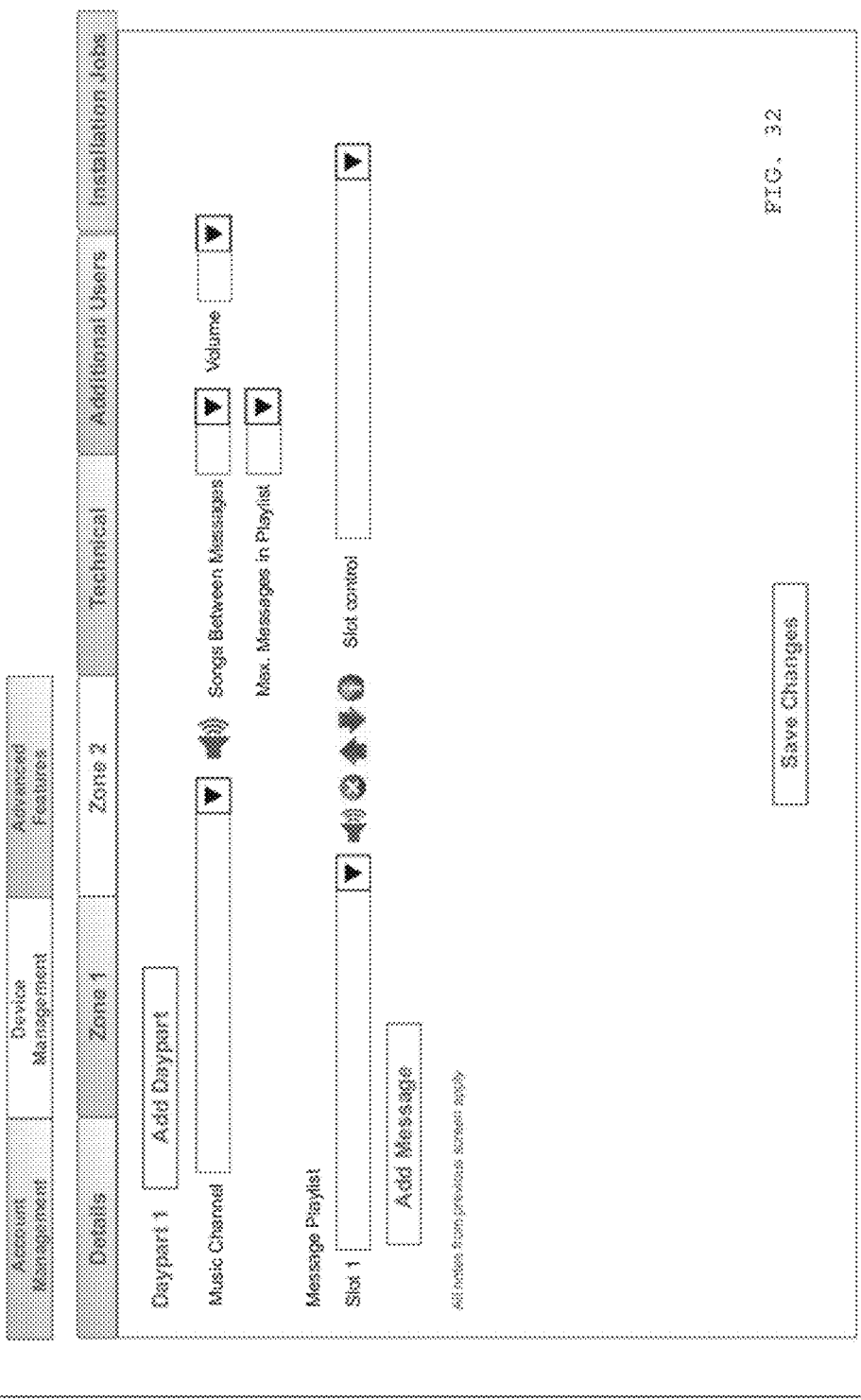
Figure 33:
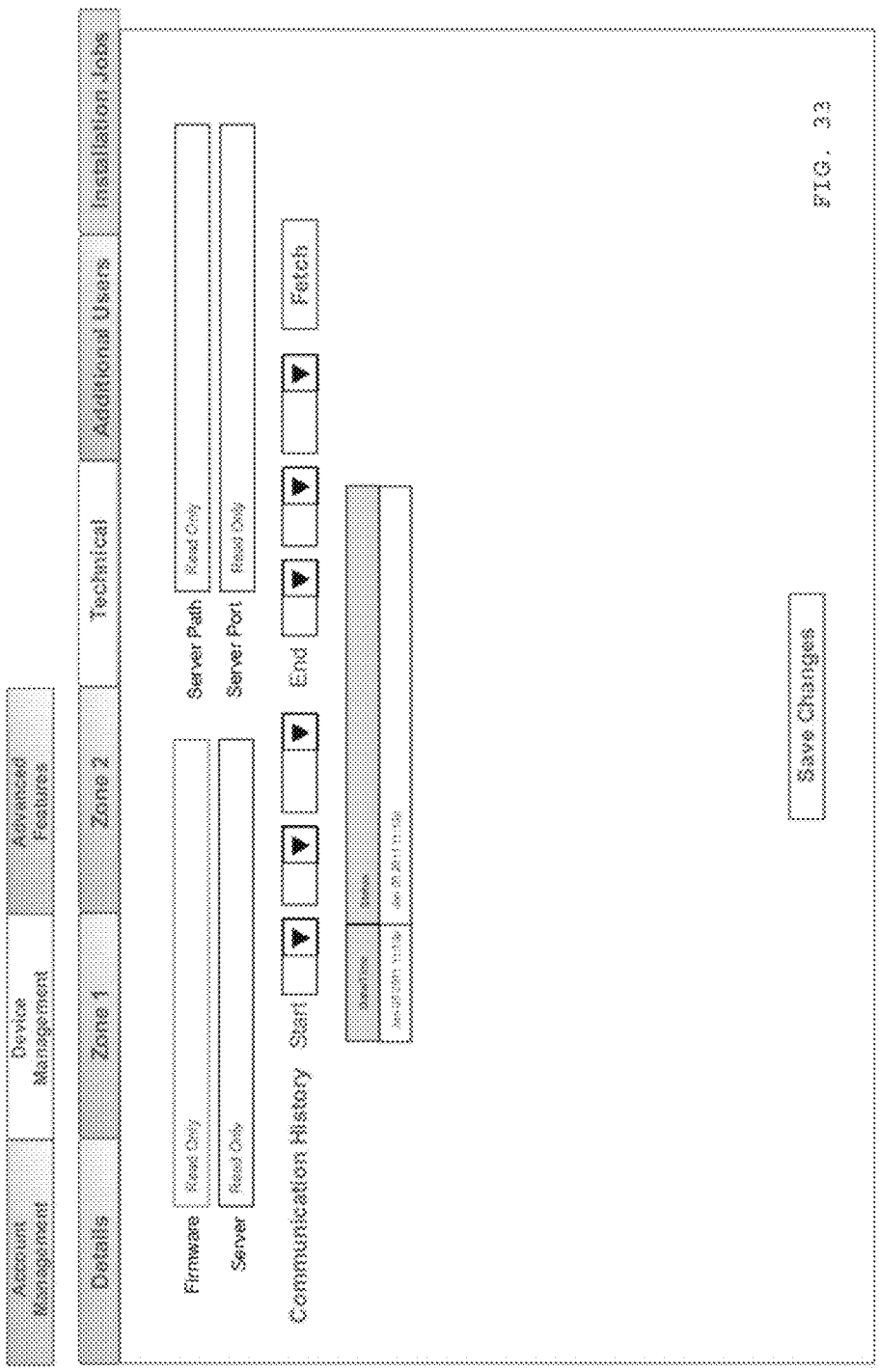
Figure 36:
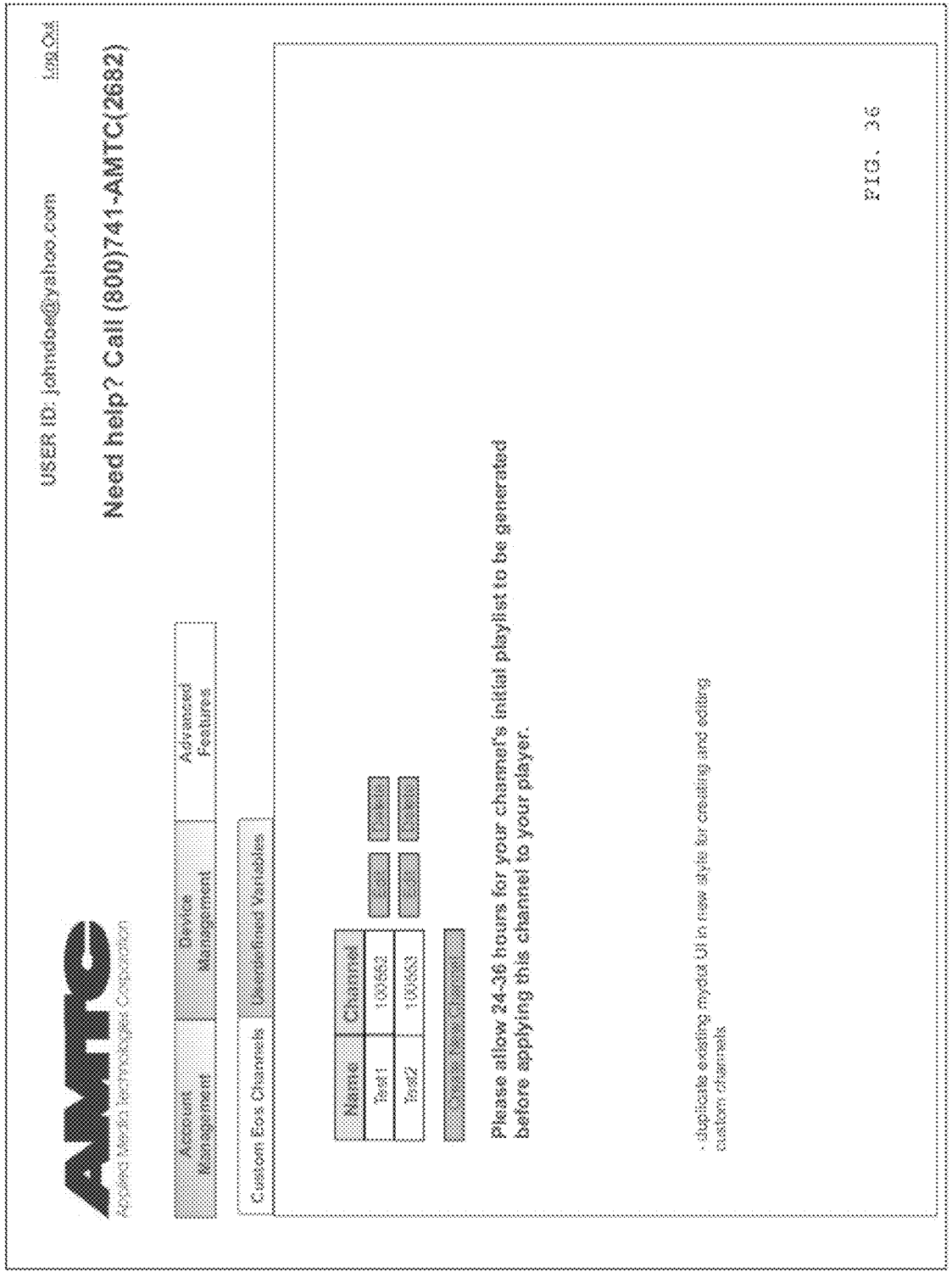
Figure 38:
Figure 39:
Figure 40:
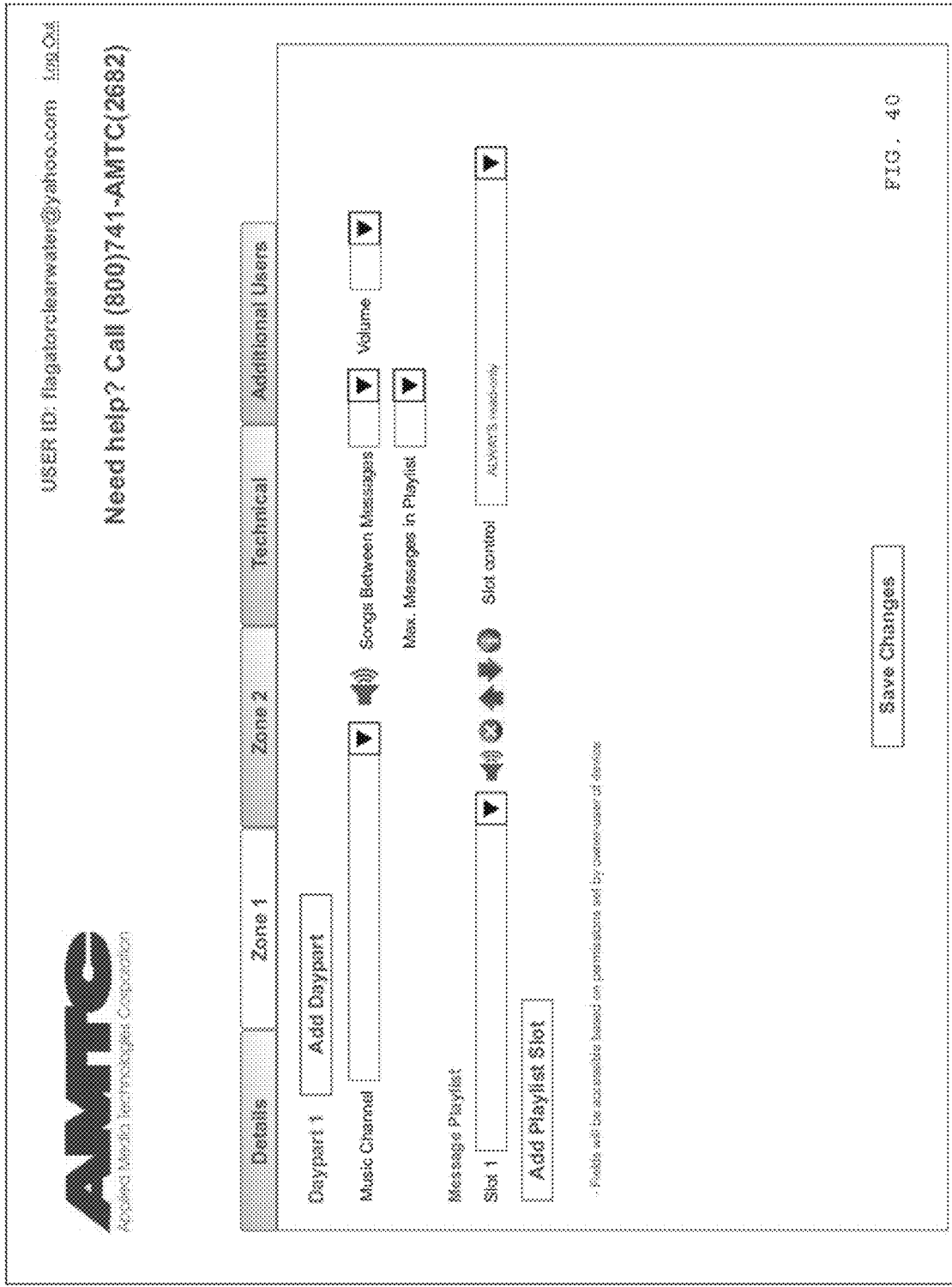
Figure 42:

As shown in FIG. 11, the invention also includes an audio content distribution control system that permits more than one user to access and control features of the system which distributes audio files to one or more locations for playing (or playback) on one or more playback devices. The system can be used by a single user or by a plurality of users, for example, large multi-location customers who have multiple users. The audio content distribution control system can include software, a computer, a server, a telecommunications network, and a playback device. The software can feature a user interface and software application features that permit multiple users to access and control the selection and distribution of a plurality of audio files. The computer can include a display device on which the user interface is viewable. The server can feature a master audio content database, wherein the master audio content database includes a plurality of audio files. The software can be installed on the server. The telecommunications network can communicatively connect to the computer and server. The playback device can download and play audio files, and is communicatively connected to the server. These components of the system are described in more detail below.

In one embodiment, the audio content distribution control system can include a shared access control module or feature that permits at least one user to be designated an administrator with administrative privileges that allow absolute control over the system's controllable features. One or more other users can be secondary users who have varying degrees of control over the system's controllable features, wherein the degree of control granted to each secondary user can be set by the administrator using user access control features of the system and its shared access control module. In one example, a manufacturer can use the system to share control of advertising messages and other audio files with the manufacturer's dealers. The manufacturer can assign each dealer a predetermined number of messages to control. As administrator, the manufacturer can use the system to monitor its dealers to make certain that the manufacturer's messages are being played by the dealers.

The audio content distribution control system can include software that is installed on a server located either locally or remotely from the location where the users are located. The system may include more than one server on which software and databases of the system are installed. The server can be located remotely from the computer and the playback device. The playback device can be remotely communicatively connected to the server via the telecommunications network. The playback device can feature remotely controllable adjustable control settings that can be controlled by a user via the user interface.

The system can be accessed remotely or locally via a computer that is connected to a telecommunications network. The computer can be, for example, a desktop computer, a laptop computer, a personal digital assistant device, a cellular phone, a smart phone, a digital music and messaging player device having a web browser software and Internet connection, or any other portable, handheld, or stationary electronic computing device. The telecommunications network can be, for example, the Internet, a local area network, a wide area network, a wireless cellular network, or any other suitable wired or wireless telecommunications network to which the computer can connect for the purpose of downloading and uploading (or transferring) data via the telecommunications network to and from the server. In one embodiment, the system can include a user interface that is accessible on a website hosted on the same server or on a different server, which can be accessed and viewed on a display device of the computer. The system and its features can be accessed and controlled by the user using the user interface that is accessible on the website. In another embodiment, the system can include a downloadable software application or installable software application that can be installed on the computer device and which includes a user interface through which the system and its features can be accessed and controlled. The software of the user interface and the system features can be installed on a computing device wherein the computing device is the server or one or more computers of the system.

The server can include one or more master audio content databases installed thereon which store audio files that can be viewed and selected for distribution by the user. The server can include an integrated or separate but connected transmitter, receiver and transmitter, or transceiver to transmit electronically, via a wired or wireless telecommunication system, the selected audio files for playing on the playback device. The audio files can be preset audio files provided and made available by the system manufacturer, audio files uploaded by one or more users, or a combination of both preset and uploaded audio files. The audio files can be sound recordings of music, advertisements, or any other suitable audio content that the user wishes to distribute for playing on the playback device. The playback device can be a digital music and messaging player device, a receiver, a transceiver, an intercom system, a stereo system with speakers, a telephone system, a radio system, a satellite radio system, or any other suitable wired or wireless audio playback device.

In an exemplary embodiment, the playback device features an integrated system for downloading audio files from the server and for playing back the audio files. In other embodiments, the playback device can include a system for downloading audio files from the server and a separate system for playing back the audio files that can interface with and be connected to the system for downloading audio files. The system can further include an audio system featuring speakers for playing aloud the audio files downloaded by the playback device from the server. The playback device can be communicatively connectable to the audio system.

The playback device can include a converter software application that converts the digital audio files downloaded and received from the server into analog audio content that can be played by a conventional audio system having at least one speaker for playing audio content for listening, e.g., a telephone, a telephone system, a stereo system, or an intercom system. The converter software application can be installed on the system for downloading and receiving audio files from the server, or the converter software application can be installed on the separate system for playing back the audio files in embodiments where that separate system for playing back audio files includes a computer processor.

The playback device is communicatively connected to the server so as to download and obtain audio files transmitted from the server to the playback device. The playback device can be programmed to automatically query or poll the remotely located server for any modified adjustable control settings and any new audio content selected by a user using commands submitted by the user through the user interface viewed on the display device of the computer. By polling the server periodically, the playback device pulls new settings and audio content from the server, as selected by the user, and downloads the new settings and audio content to the playback device for implementation of the new settings and playing of the new audio content. The playback device can be communicatively connected to the server by the same telecommunications network that communicatively connected the server and computer or by a different telecommunications network. The playback device can include speakers as integral components or separate freestanding speakers may be connected to the playback device. The playback device can include adjustable control settings that can be modified by the user either using control buttons or touchscreen control features on the playback device or via remote control features accessed remotely using the computer and user interface as shown in FIGS. 12-43. Some examples of suitable playback devices that can be used with the system include Horizon, RemoteLink IP, iQueue 2, iQueue 3, iQueue 3.5, and various Sirius Satellite Radio receivers.

The audio content distribution control system can also include a multi-user advertisement upload feature that allows multiple users to log in to the system via a computer with connection to the telecommunications network and place advertisements in sound slots existing in music played at a business or other location. The music can be telephone hold message music or intercom music played over a speaker or other sound playback system installed in a store or other location. Thus, using the system, an administrator such as, for example, a retailer, can permit one or more advertisers to access the system by logging in to alter the advertiser's advertisements without requiring the retailer's involvement.

The audio content distribution control system can also include a audio file selection feature that permits the user to select audio files from a customized mix of files selected by the user or from a preset playlist of audio files. In an exemplary embodiment, the audio files are individual songs or genres of music. The audio selection feature of the audio content distribution control system may also permit the user to determine the percentage of time each genre of music plays at a user location. The user location can be a retail store, business telephone system, or other suitable physical location or communications system.

By accessing the user interface on the website by computer, any user authorized to make changes to a playback device can modify or adjust the playback device's adjustable control settings. Users can have access to one or many playback devices, and one playback device can be accessible to one or many users. Any user that has authority to access a particular playback device can modify any adjustable control settings, which are customer-modifiable settings of the playback device such as, for example, its volume, messaging interval, subscription type, and advertising content. In one embodiment, no hierarchy exists between multiple users as they are related to a playback device. In other embodiments, a hierarchy may exist between multiple users insofar as which users have ultimate and absolute control over a playback device.

The system can require each new customer to register for a new administrator user account, which includes creating a user name and password to access the system via the user interface. Once the new administrator user account is created, a customer database can also be created, which includes a predetermined number of unassigned slots into which advertisements or other audio content may be placed for playing on the playback device. The system also permits the administrator to create new user accounts for secondary users who have limited access to select audio content and to modify the playback device's adjustable control settings. A secondary user can upload audio advertisements, informative messages, or other audio content for playing in the slot assigned to that user so that as the playlist of music or other audio content plays in a loop, at regular intervals, the user's assigned slot will be reached in the loop and its selected audio content played on the playback device.

The audio files can stored in any digital electronic audio file format including, for example, MP3, WMA, AAC, Ogg Vorbis, and any other suitable audio file format capable of being played on the playback device.

Any playback device can have any number of administrator users and secondary users; however, in an exemplary embodiment, by default, each playback device will initially have a single user, the administrator. The administrator can thereafter delegate user privileges for the playback device to as many secondary users or additional administrator users as the original administrator desires. The administrator can also select which features of the system each secondary user is permitted to access and control. Individual permissions that can be granted separately include: requesting custom production, altering billing and subscription details, adjusting playback settings such as volume and shuffle mode, changing the background music channel, location setup information, and advertising message selection. In addition, the administrator can delegate control of individual advertising "slots" on the administrator's playlist for a playback device or group of playback devices to specific secondary users, thereby allowing the secondary users to change only their allocated portion (i.e., slot or slots) of the playlist.

The system can also include a cloning tool that permits a user to copy all of the modified settings and audio content selection of one playback device for use with one or more different playback devices.

The audio files can include music, audio books, advertisements, telephone messages, on-hold telephone messages, informational audio content, news audio content, or any other suitable audio content capable of playing on the playback device.

In one embodiment, the audio content distribution control system can store and distribute multimedia files for playing on the playback device, which multimedia files can include both audio and video content.

Example

A franchisor of a grocery store chain is an administrator. The franchisor provides a playback device to its franchisee at the franchisee's location. As the original purchaser, the franchisor is the administrator for the new playback device, which includes a unique serial number. The franchisor desires to use a portion of the messaging rotation to discuss the grocery store chain's promotions. The franchisor selects a playlist length for music that is to be played via an intercom system in franchisees' stores. The franchisor further selects the playlist length to provide four assignable slots for playing of four advertisements. The franchisor does not assign slots 1, 2, 3, or 4 to any secondary user. Because slots 1, 2, 3, and 4 have not been assigned to a secondary user, their content is editable only by the administrator, in this example the franchisor. Because the franchisor in this example is the only administrator, or master user, the franchisor is the only user who can edit the messages assigned to these unassigned slots.

The franchisee desires to promote its special of the week. The franchisor uses the website and interface accessed via a computer to create a new secondary user account for the franchisee. The franchisor provides the franchisee access to modify or adjust some or all of the playback device's adjustable control settings, e.g., the volume setting. The franchisor also allots unassigned message slot 2 to the franchisee so as to permit the franchisee to select and assign a franchisee-selected advertisement or other audio message into slot 2. The franchisee is not granted access or permission to alter the audio content of slots 1, 3, or 4. Because the franchisor is the administrator in this example, the franchisor retains system permission to override the franchisee's audio content selection.

Thereafter, the franchisor enters into a nationwide advertising contract with a beverage manufacturer to promote the beverage manufacturer's products in all of the franchisor's grocery stores. The franchisor creates a new secondary user account for the beverage manufacturer. The franchisor does not grant the beverage manufacturer access to change the playback device's adjustable control settings but does assign unassigned slot 4 to the beverage manufacturer. Now, only the beverage manufacturer (or the franchisor as administrator) may alter the audio content selection of slot 4. The franchisee does not have system access to change slot 4's audio content, nor does the beverage manufacturer have access to change slot 2's audio content, which was selected by the franchisee. The beverage manufacturer also does not have administrative access privileges to change the content of unassigned slots 1 and 3. The playback device now has four messages in its looping playlist. The franchisor selects the interval at which the playlist loops to repeat itself and the audio content selections placed in the slots. As secondary users, at any time, the franchisee and the beverage manufacturer may log in to their respective secondary user accounts and make desired modifications to their audio content selections in their respective assigned slots, but may not change any other settings related to the playback device.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An audio content distribution control system for automated audio file distribution to one or more playback devices, the system comprising:
   software comprising a user interface and software application features that permit multiple users to access and control the selection and distribution of a plurality of audio files;
   a computer comprising a display device on which the user interface is viewable;
   a server comprising a master audio content database, wherein the master audio content database comprises a plurality of audio files, and wherein the software is installed on the server;
   a telecommunications network for communicatively connecting the computer and server; and
   a playback device for downloading and playing audio files, wherein the playback device is communicatively connected to the server and is located in a location that is remote from the server and the computer, and wherein the playback device automatically polls the server to download new adjustable control settings and audio content from the server, as selected by a user using the software installed on the server via the computer, to the playback device for implementation of the new settings and playing of the new audio content.

2. The audio content distribution control system of claim 1, wherein the playback device is communicatively connectable to an audio system comprising speakers for playing the audio files downloaded by the playback device from the server.

3. The audio content distribution control system of claim 1, wherein the server is located remotely from the computer and the playback device.

4. The audio content distribution control system of claim 3, wherein the playback device is remotely communicatively connected to the server via the telecommunications network.

5. The audio content distribution control system of claim 1, wherein the playback device comprises remotely controllable adjustable control settings that can be controlled by a user via the user interface.

6. The audio content distribution control system of claim 5, wherein adjustable control settings comprise at least one remotely controllable setting selected from the group consisting of: shared access control settings in which user permissions are delegated, volume, messaging interval, subscription type, advertising content, shuffle mode, changing a background music channel, location setup information, advertising message selection, and any other functional setting of the playback device.

7. The audio content distribution control system of claim 1, wherein the playback device periodically communicatively connects to the server via the telecommunications network to query whether any adjustable control settings of the system have been modified and whether any additional audio files have been added to a customer database in which a playlist is created and stored for playing audio files contained in that playlist on the playback device.

8. The audio content distribution control system of claim 7, wherein the playback device automatically downloads modified adjustable control settings and newly added audio files from the server for implementation and playing on the playback device.

9. The audio content distribution control system of claim 1, wherein the playback device is an integrated component of the computer.

10. The audio content distribution control system of claim 1, wherein at least one user is an administrator with electronic system privileges to change an adjustable control setting of the playback device.

11. The audio content distribution control system of claim 10, wherein at least one user is a secondary user granted predetermined limited rights to modify certain adjustable control settings of the playback device to which the administrator desires to grant access to the secondary user for the secondary user's customization.

12. The audio content distribution control system of claim 10, wherein one adjustable control setting is a cloning tool that copies settings and audio files of one playback device modified by the user for use with one or more other playback devices.

13. The audio content distribution control system of claim 1, wherein the system creates a customer database in which a playlist is created and stored for playing on the playback device, wherein the customer database is unique to and accessible by one customer including the customer's at least one administrator user and at least one secondary user.

14. The audio content distribution control system of claim 13, wherein the playlist comprises preloaded audio files.

15. The audio content distribution control system of claim 13, wherein the playlist comprises audio files uploaded by the user.

16. The audio content distribution control system of claim 13, wherein the playlist stored in the customer database can be created by selecting audio files stored in the master audio content database or by uploading audio files to the system via the computer and user interface.

17. The audio content distribution control system of claim 16, wherein uploaded audio files are electronically transmitted from the computer to the server for storage in the customer database.

18. The audio content distribution control system of claim 16, wherein the playlist comprises a number of unassigned slots into which audio files are electronically insertable for playing as the playlist is played by the playback device, and wherein the number of such unassigned slots is determined by the administrator.

19. The audio content distribution control system of claim 18, wherein the system comprises a slot assignment control feature by which the administrator can assign audio file selection privileges for the unassigned slot to at least one secondary user.

20. The audio content distribution control system of claim 19, wherein the system is programmed to the play the audio files in the playlist in a repeating loop.

21. The audio content distribution control system of claim 19, wherein a plurality of the playback devices are installed remotely from the server and automatically download the playlist and audio files of the playlist for playing via electronic transmission over the telecommunications network.

22. The audio content distribution control system of claim 19, wherein unassigned slots in a playlist are assignable to more than one secondary user for playing in a playlist of one of the playback devices.

23. The audio content distribution control system of claim 1, wherein the audio files comprise at least two items selected from the group consisting of: music, audio books, advertisements, telephone messages, on-hold telephone messages, informational audio content, news audio content, or any other suitable audio content capable of playing on the playback device.

* * * * *